United States Patent
Taylor et al.

(10) Patent No.: US 12,132,209 B2
(45) Date of Patent: *Oct. 29, 2024

(54) BATTERY GRID WITH VARIED CORROSION RESISTANCE

(71) Applicant: CPS Technology Holdings LLC, New York, NY (US)

(72) Inventors: M. Eric Taylor, Milwaukee, WI (US); Jianxun Hu, Mequon, WI (US); Glenn W. Andersen, Hartford, WI (US); Joseph F. Mathews, Milwaukee, WI (US); Bart W. Sauer, Walhalla, SC (US); James S. Symanski, Greenfield, WI (US); Feng Xue, Menomonee Falls, WI (US); Mohamadkheir Alkhateeb, Brookfield, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,924

(22) Filed: Dec. 21, 2022

(65) Prior Publication Data

US 2023/0124818 A1    Apr. 20, 2023

Related U.S. Application Data

(60) Continuation of application No. 17/110,034, filed on Dec. 2, 2020, now Pat. No. 11,539,051, which is a (Continued)

(51) Int. Cl.
*H01M 4/73* (2006.01)
*H01M 4/20* (2006.01)
*H01M 4/82* (2006.01)

(52) U.S. Cl.
CPC ............... *H01M 4/73* (2013.01); *H01M 4/82* (2013.01); *H01M 4/20* (2013.01); *Y10T 29/10* (2015.01)

(58) Field of Classification Search
CPC ...................................................... H01M 4/73
See application file for complete search history.

(56) References Cited

U.S. PATENT DOCUMENTS 345,511 A    7/1886   Khotinsky
487,834 A   12/1892   Griscom
(Continued)

FOREIGN PATENT DOCUMENTS

CN    1279824 A    1/2001
CN    1391303 A    1/2003
(Continued)

OTHER PUBLICATIONS

Patent Abstract for AU 275685.
(Continued)

*Primary Examiner* — Brian R Ohara
(74) *Attorney, Agent, or Firm* — Boardman & Clark LLP

(57) ABSTRACT

A battery grid is disclosed. The battery grid includes a pattern of grid wires. The pattern includes a grid wire having a first segment with a first corrosion resistance and a second segment with a second corrosion resistance which is less than the first corrosion resistance. The second segment corrodes at a rate which is faster than the corrosion rate of the first segment so as to dynamically release internal stress and control grid growth of the battery grid during its service life. A battery includes said grid and a method of forming said grid are also disclosed.

20 Claims, 9 Drawing Sheets

Related U.S. Application Data division of application No. 15/679,736, filed on Aug. 17, 2017, now Pat. No. 10,892,491, which is a division of application No. 13/663,872, filed on Oct. 30, 2012, now Pat. No. 9,761,883.

(60) Provisional application No. 61/555,276, filed on Nov. 3, 2011.

(56) References Cited

U.S. PATENT DOCUMENTS

| | | |
|---|---|---|
| 669,085 A | 3/1901 | Heidel |
| 1,129,690 A | 2/1915 | Knobloch |
| 1,347,873 A | 7/1920 | Rabe |
| 1,364,760 A | 1/1921 | Holland et al. |
| 1,381,008 A | 6/1921 | Polk |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Reginald et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De Martis et al. |
| 2,282,760 A | 5/1942 | Hauel |
| 2,882,760 A | 5/1942 | Haud |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill et al. |
| 3,398,024 A | 8/1968 | Barnes et al. |
| 3,408,236 A | 10/1968 | Hartesveldt |
| 3,453,145 A | 7/1969 | Duddy |
| 3,466,193 A | 9/1969 | Hughtel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,909,293 A | 9/1975 | Hammond et al. |
| 3,923,545 A | 12/1975 | Marguiles et al. |
| 3,926,247 A | 12/1975 | Geiger |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Feagin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney, Jr. et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,614,630 A | 9/1986 | Pluim, Jr. |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | McLoughlin et al. |
| 4,906,540 A | 3/1990 | Hoshihara et al. |
| 4,932,443 A | 6/1990 | Karolek et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Henning et al. |
| 5,601,953 A | 2/1997 | Schenk |
| 5,611,128 A | 3/1997 | Wirtz |
| 5,643,696 A | 7/1997 | Rowlette |
| 5,660,600 A | 8/1997 | Vyas |

(56) References Cited

U.S. PATENT DOCUMENTS

| | | |
|---|---|---|
| 5,660,946 A | 8/1997 | Kump et al. |
| 5,691,087 A | 11/1997 | Rao et al. |
| 5,834,141 A | 11/1998 | Anderson et al. |
| 5,851,695 A | 12/1998 | Misra et al. |
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,274 A | 9/1999 | Dobie et al. |
| 5,958,625 A | 9/1999 | Rao |
| 5,989,749 A | 11/1999 | Kao et al. |
| 6,026,722 A | 2/2000 | Lopez Ascaso et al. |
| 6,037,081 A | 3/2000 | Kashio et al. |
| 6,057,059 A | 5/2000 | Kwok et al. |
| RE36,734 E | 6/2000 | Binder et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 | 1/2001 | Rao et al. |
| 6,203,948 B1 | 3/2001 | Kao et al. |
| 6,245,462 B1 | 6/2001 | Kao et al. |
| 6,267,923 B1 | 7/2001 | Albert et al. |
| 6,274,274 B1 | 8/2001 | Schaeffer et al. |
| 6,291,097 B1 | 9/2001 | Barker et al. |
| 6,291,104 B1 | 9/2001 | Yoshihara et al. |
| 6,312,852 B1 | 11/2001 | Wagner |
| 6,342,110 B1 | 1/2002 | Palumbo |
| 6,348,283 B1 | 2/2002 | Mas et al. |
| 6,351,878 B1 | 3/2002 | Rao |
| RE37,804 E | 7/2002 | Mattan |
| 6,419,712 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,592,686 B2 | 7/2003 | Palumbo |
| 6,604,058 B2 | 8/2003 | Nakayama |
| 6,649,306 B2 | 11/2003 | Prengaman |
| 6,749,950 B2 | 6/2004 | Zhang |
| 6,755,874 B2 | 6/2004 | Chen et al. |
| 6,797,403 B2 | 9/2004 | Clark et al. |
| 6,833,218 B2 | 12/2004 | Mann |
| 6,921,611 B2 | 7/2005 | Schaeffer et al. |
| 6,953,641 B2 | 10/2005 | Chen |
| 7,398,581 B2 | 7/2008 | Chen |
| 7,767,347 B2 | 8/2010 | Kao et al. |
| 7,799,463 B2 | 9/2010 | Schaeffer et al. |
| 8,034,488 B2 | 10/2011 | Schaeffer et al. |
| 9,368,800 B2 | 6/2016 | Harker et al. |
| 9,577,266 B2 | 2/2017 | Troxel et al. |
| 9,761,883 B2 | 9/2017 | Taylor et al. |
| 10,892,491 B2 * | 1/2021 | Taylor ................ H01M 4/82 |
| 11,539,051 B2 * | 12/2022 | Taylor ................ H01M 4/82 |
| 2002/0015891 A1 | 2/2002 | Schaeffer et al. |
| 2002/0088515 A1 | 7/2002 | Aust et al. |
| 2002/0182478 A1 | 12/2002 | Wirtz |
| 2002/0182487 A1 | 12/2002 | Wirtz |
| 2003/0059674 A1 | 3/2003 | Mann et al. |
| 2003/0096170 A1 | 5/2003 | Fujiwara et al. |
| 2004/0033157 A1 | 2/2004 | Schaeffer |
| 2004/0038129 A1 | 2/2004 | Mann |
| 2004/0187986 A1 | 9/2004 | Schaeffer |
| 2005/0112470 A1 | 5/2005 | Taylor et al. |
| 2005/0150092 A1 | 7/2005 | Chen |
| 2005/0164091 A1 | 7/2005 | Schaeffer et al. |
| 2006/0096079 A1 | 8/2006 | Farina |
| 2006/0213055 A1 | 9/2006 | Fujiwara |
| 2007/0111089 A1 | 5/2007 | Swan |
| 2008/0289161 A1 | 11/2008 | Chen |
| 2009/0258299 A1 | 10/2009 | Kao et al. |
| 2009/0291359 A1 | 11/2009 | Wirtz et al. |
| 2010/0266903 A1 * | 10/2010 | Kao ................ H01M 4/742 |
| | | 429/241 |
| 2010/0304219 A1 | 12/2010 | Schaeffer |
| 2011/0033744 A1 | 2/2011 | Gerber |
| 2011/0159369 A1 | 6/2011 | Chen |
| 2012/0047719 A1 | 3/2012 | Schaeffer et al. |
| 2012/0058394 A1 | 3/2012 | Schaeffer |

FOREIGN PATENT DOCUMENTS

| | | |
|---|---|---|
| CN | 1515043 A | 7/2004 |
| CN | 1751255 | 3/2006 |
| CN | 1833896 A | 9/2006 |
| CN | 101182620 | 5/2008 |
| CN | 101233635 A | 7/2008 |
| CN | 201514971 U | 6/2010 |
| CN | 201562712 U | 8/2010 |
| CN | 201741750 U | 2/2011 |
| CN | 202094214 U | 12/2011 |
| DE | 1007835 B | 5/1957 |
| DE | 2528688 | 1/1977 |
| DE | 8013625 U1 | 11/1980 |
| DE | 3045683 | 6/1982 |
| DE | 3234342 A1 | 3/1984 |
| DE | 102008029386 A1 | 12/2009 |
| EP | 0029788 | 11/1980 |
| EP | 0065996 | 5/1981 |
| EP | 0348702 | 1/1990 |
| EP | 0589549 | 3/1994 |
| EP | 0795917 A2 | 9/1997 |
| EP | 0969108 | 1/2000 |
| EP | 1041164 | 10/2000 |
| EP | 1270754 | 2/2003 |
| EP | 2774199 B1 | 9/2014 |
| GB | 570953 | 7/1945 |
| GB | 724056 A | 2/1955 |
| GB | 1377039 | 5/1973 |
| GB | 1 376 162 A | 12/1974 |
| GB | 2127614 A | 7/1983 |
| GB | 2170343 | 7/1986 |
| JP | 56-110578 | 1/1955 |
| JP | 58-155660 | 9/1958 |
| JP | S39-11225 | 4/1964 |
| JP | 50028638 | 3/1975 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60-78570 | 5/1985 |
| JP | 60143570 | 7/1985 |
| JP | 60150556 | 8/1985 |
| JP | 60167267 | 8/1985 |
| JP | 60167268 | 8/1985 |
| JP | 60198055 | 10/1985 |
| JP | 61124052 | 6/1986 |
| JP | S62147653 | 7/1987 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 07065822 | 3/1995 |
| JP | 08-17438 | 1/1996 |
| JP | 8083617 | 3/1996 |
| JP | 08-213023 | 8/1996 |
| JP | 8287905 | 11/1996 |

(56) References Cited

FOREIGN PATENT DOCUMENTS

| | | |
|---|---|---|
| JP | 09-231995 | 9/1997 |
| JP | 10284085 | 10/1998 |
| JP | 11054115 | 2/1999 |
| JP | 11213993 | 8/1999 |
| JP | H11512975 | 11/1999 |
| JP | 2000-164223 | 6/2000 |
| JP | 200243402 A | 9/2000 |
| JP | 2000-340235 | 12/2000 |
| JP | 2001229920 | 8/2001 |
| JP | 2001-524736 | 12/2001 |
| JP | 2002-260716 | 9/2002 |
| JP | 2003-36852 | 2/2003 |
| JP | 2003178760 A | 6/2003 |
| JP | 2004-165149 | 6/2004 |
| JP | 2004-199951 | 7/2004 |
| JP | 2004-521445 | 7/2004 |
| JP | 2004196060 A | 7/2004 |
| JP | 2004-253324 | 9/2004 |
| JP | 2006164668 A | 6/2006 |
| JP | 2008-542997 | 11/2008 |
| JP | 2008542997 A | 11/2008 |
| JP | 2014-535153 A | 12/2014 |
| JP | 2017-157573 A | 9/2017 |
| JP | 2019-186231 A | 10/2019 |
| WO | WO 199927595 | 6/1999 |
| WO | WO 0104978 A1 | 1/2001 |
| WO | WO 2001004977 | 1/2001 |
| WO | WO 200153549 | 7/2001 |
| WO | WO 200215296 | 2/2002 |
| WO | WO 2002054513 A2 | 7/2002 |
| WO | WO 2006053697 A1 | 5/2006 |
| WO | WO 2006127575 | 11/2006 |
| WO | WO 2008/109429 A2 | 9/2008 |
| WO | WO 2009/150485 A1 | 12/2009 |
| WO | WO 2011/130514 A1 | 10/2011 |

OTHER PUBLICATIONS

International Search Report dated Oct. 12, 2000 for PCT/US00/18313.
PCT Search Report dated Oct. 9, 2000 for PCT/US00/18144.
International Search Report dated Aug. 19, 2002 for PCT/US02/00390, 7 pages.
Office Action dated May 1, 2003 for U.S. Appl. No. 09/898,660.
Office Action dated Mar. 24, 2003 for U.S. Appl. No. 09/898,660.
U.S. Appl. No. 09/898,660 titled "Modifiction of the Shape/Surface Finish of Battery Grid Wires to Improve Paste Adhesion" by Schaeffer et al., filed Jul. 2, 2001.
Ishikawa et al., "A punched grid production process for automotive batteries" from Pb 80, 7th International Conference (1980).
Perez, "The Complete Battery Book" TAB Books, Inc., 191 pp., 1985 (no month).
PCT Search Report Aug. 11, 2000 for PCT/US00/12569.
S. Goodman "Plates with improved conductivity" Batteries International, pp. 88-89 (no month).
Non-Final Office Action dated Nov. 19, 2003 from U.S. Appl. No. 09/755,337.
PCT International Search Report for PCT/US98/24345 (International Filing Date Mar. 3, 1999); date of mailing Mar. 11, 1999; 2 pp.
Reply and Amendment dated Feb. 12, 2004 from U.S. Appl. No. 09/755,337.
Final Office Action dated May 19, 2004 from U.S. Appl. No. 09/755,337.
Reply and Amendment dated Jul. 19, 2004 from U.S. Appl. No. 09/755,337.
Office Action dated Jan. 7, 2003 for U.S. Appl. No. 09/755,337.
Office Action dated Jun. 18, 2003 for U.S. Appl. No. 09/755,337.
Office Action dated Sep. 16, 2002 for U.S. Appl. No. 09/755,337.
U.S. Appl. No. 09/755,337 titled "Method for Making an Alloy Coated Battery Grid" by Yu-Lin Chen.
PCT Search Report dated Oct. 6, 1999 in PCT/US99/13291.
International Search Report and Written Opinion dated Oct. 5, 2006 for International Application No. PCT/US06/019686, 2 pages.
Response dated May 28, 2009 to Office Action for EPO Application No. 067707804.0-2119. 9 pages.
Office Action dated Jan. 21, 2009 for EPO Application No. 06770804.0-2119, 3 pages.
Office Action dated Apr. 23, 2008 for EPO Application No. 06770804.0-2119, 5 pages.
Response dated Oct. 28, 2008 to Office Action for EPO Application No. 06770804.0-2119, 5 pages.
Chinese Patent Office, Office Action (with English Translation) dated Jul. 6, 2009 for Chinese Patent Application No. 200680017715.1 based on PCT/US06/019686, 12 pages.
Office Action dated Sep. 30, 2009 from U.S. Appl. No. 11/984,666.
Amendment and Response dated Dec. 30, 2009 from U.S. Appl. No. 11/984,666.
Office Action dated Jan. 19, 2010 from Brazil Patent Application No. PI 0206343-3 (with English Translation).
Office Action dated Aug. 5, 2009 (with English translation) for Chinese Patent Appln. No. 20060017715.1.
Response dated Sep. 23, 2009 for Chinese Patent Appln. No. 20060017715.1.
Traditional Lead Acid Battery Shortcomings, www.fireflyenergy.com.
Megger, Failure Modes—Lead-acid (flooded) failure modes, Battery Testing Guide, p. 7.
Written Opinion of the International Searching Authority, International Application No. PCT/US2011/026836.
International Search Report, International Application No. PCT/US2011/026836.
International Search Report and Written Opinion of the International Searching Authority dated Jul. 24, 2013 for PCT/US2012/062698 filed Oct. 31, 2012.
International Preliminary Report on Patentability and Written Opinion of the International Searching Authority dated May 5, 2016 for PCT/EP2014/072556, 15 pgs (English transl.).
Yue, Sun et al., "Metal Corrosion and Control," Harbin Institute of Technology Press, Apr. 30, 2003, pp. 181 and 204-205.

\* cited by examiner

BATTERY GRID WITH VARIED CORROSION RESISTANCE

CROSS-REFERENCE TO RELATED APPLICATIONS

This application is a continuation application of U.S. Nonprovisional patent application Ser. No. 17/110,034 filed Dec. 2, 2020, entitled BATTERY GRID WITH VARIED CORROSION RESISTANCE, now U.S. Pat. No. 11,539, 051, which claims priority as a divisional application to U.S. Nonprovisional patent application Ser. No. 15/679,736 filed Aug. 17, 2017, entitled BATTERY GRID WITH VARIED CORROSION RESISTANCE, now U.S. Pat. No. 10,892, 491, which is a divisional application of U.S. Nonprovisional patent application Ser. No. 13/663,872 filed Oct. 30, 2012, entitled BATTERY GRID WITH VARIED CORROSION RESISTANCE, now U.S. Pat. No. 9,761,883, which claims priority to U.S. Provisional Patent Application No. 61/555,276, filed Nov. 3, 2011, entitled ENHANCED POSITIVE BATTERY GRID, the entire contents of each of which is hereby incorporated by reference in its entirety.

FIELD

The present inventions relate to the field of batteries (e.g., lead-acid batteries including batteries for vehicle starting, lighting and ignition applications; marine batteries; commercial batteries; industrial batteries; batteries for use with hybrid-electric vehicles, micro-hybrid vehicles, etc.). The present inventions more specifically relate to battery grids and methods of making battery grids.

BACKGROUND

A secondary battery, or rechargeable battery, storage battery or accumulator is a group of one or more electrochemical cells, in which the electrochemical reactions are electrically reversible.

As is known, lead-acid batteries are made up of plates of lead and separate plates of lead dioxide, which are submerged into an electrolyte solution. The lead, lead dioxide and electrolyte cause a chemical reaction that releases electrons, allowing them to flow through conductors to produce electricity.

A lead-acid battery generally has a long life, or lifecycle, resulting in a large number of discharge/charge cycles. As the battery discharges, the acid of the electrolyte reacts with the materials of the plates, changing their surface to lead sulfate. When the battery is charged, the chemical reaction is reversed. That is, as a lead-acid battery is charged positive electrode active material is converted from lead sulfate/lead oxide to lead dioxide. Battery grids, and in particular positive battery grids, have been known to grow over time as the grid goes through its lifecycle.

One commonly known failure mode of a lead-acid battery occurs naturally through positive grid growth. Moreover, excessive cycling of the battery, excessive temperature, and over-charging can accelerate the rate of positive grid corrosion and thus grid growth.

Traditional battery grid manufacturing often takes special care to avoid significantly damaging the battery grid wire structure. As reported by Prengaman (Pb-80 Seventh International Lead Conference, Madrid, Lead Development Association, London, 1983, p. 34), deforming lead alloy materials after aging greatly reduces the subsequent mechanical properties and grain structure, as well as the corrosion resistance. Corrosion remains one of the most common failure modes of lead-acid batteries. Traditionally, therefore, battery grids are formed to avoid excessive corrosion and/or oxidation.

Many battery manufacturers compensate for grid growth by designing battery casings with an area of clearance to allow for grid growth over the course of the battery's life. Other battery manufacturers attempt to mitigate the effects of corrosion by focusing development efforts on corrosion-resistant lead alloys for their specific grid manufacturing processes. Another alternative may be to add lead to the grid to reduce grid growth. However, the foregoing suffers from increased material and cost.

Traditional grid design often limits the size of openings in the grid based on manufacturing constraints and/or to ensure retention of the wet paste within the grid structure. Further, larger battery size may not be desirable or possible in many applications due to limited battery space allowed by a vehicle manufacturer. Additionally, while making the individual plates smaller within the existing battery case may provide the desired room for grid expansion, such an action may compromise capacity and high rate performance. Thus, the flexibility to provide more space within the container to accommodate grid growth is limited in traditional lead-acid batteries.

SUMMARY

Accordingly, a battery grid is provided having a pattern of grid wires. The pattern includes a grid wire having a first segment with a first corrosion resistance and a second segment with a second corrosion resistance which is less than the first corrosion resistance. The second segment corrodes at a rate which is faster than the corrosion rate of the first segment so as to dynamically release internal stress of the battery grid during its service life.

A further battery grid including a pattern of grid wires is provided. The pattern has a predetermined first corrosion rate. A grid wire segment in the pattern has a predetermined second corrosion rate which is different from the first corrosion rate so as to dynamically release internal stress of the battery grid during its service life.

A further battery grid is provided including a pattern of grid wires. The pattern includes a grid wire with a primary deformation and a secondary deformation. The secondary deformation has a faster corrosion rate than a corrosion rate of the grid wire so as to dynamically release internal stress of the battery grid during its service life.

A method of forming a battery grid is also provided. The method includes forming a battery grid having a pattern of grid wires. The cross-sectional corners of grid wires in the pattern of grid wires are modified. A grid wire segment in the pattern of grid wires is also modified such that the segment has a corrosion resistance which is different from another grid wire segment in the pattern, and one grid wire segment will corrode at a rate which is faster than a corrosion rate of another grid wire segment in the pattern of grid wires.

The grid and methods described herein, according to one or more examples of embodiments, make it possible to create the extra space necessary in the grid to release the internal stresses dynamically, during the actual service life of the battery and grid. One or more examples of the method involve controlling the microstructure of a carefully targeted grid wire segment in such a way that it can be selectively rendered to corrode away, unable to transmit stress, and/or reduce the accumulation of stress that causes battery failures.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following Figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

A grid or current collector for a battery is disclosed, and in particular a rechargeable battery, such as, for example, a lead-acid battery.

As set forth in greater detail below, known arts of lead acid battery grid making include: batch processes such as book mold gravity casting; and continuous processes such as strip expansion, strip stamping, continuous casting, and continuous casting followed by rolling. Grids made from these processes have unique features characteristic of the particular process and behave differently in lead-acid batteries, especially with respect to the pasting process. It should be appreciated that grids formed from any conventional or later-developed grid manufacturing process may be utilized, with the devices, features, and processes described herein, and it is not the intent to limit the invention to the specific grid design disclosed for purposes of illustration herein.

Figure 1:
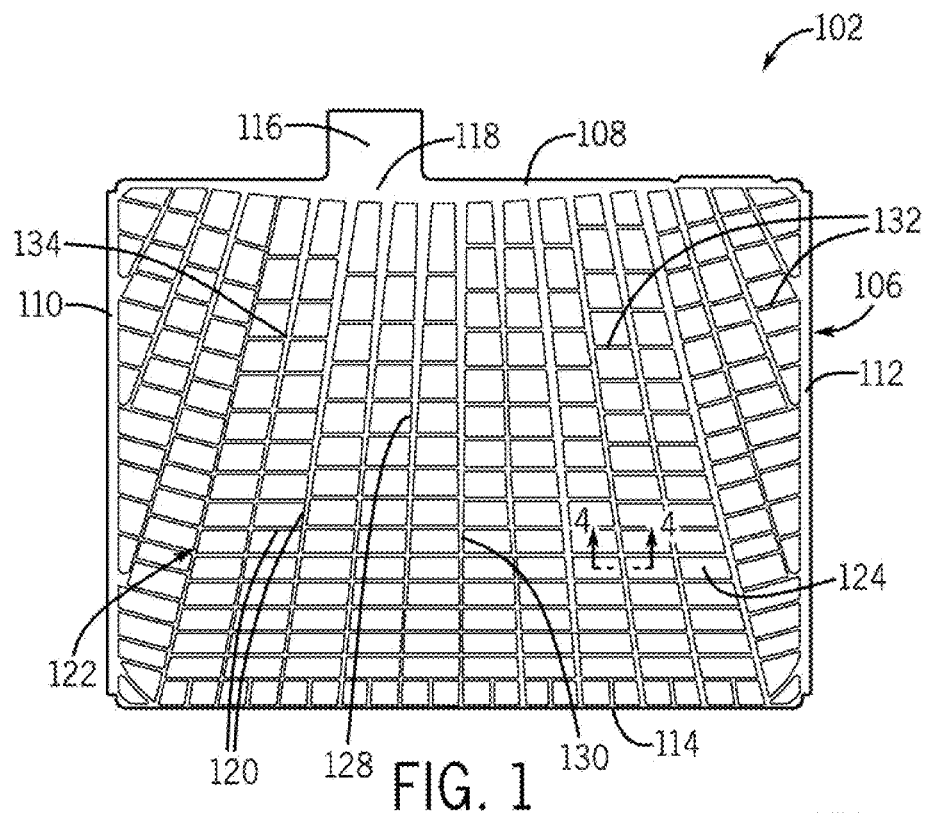
FIG. 1 is an elevational view of one or more examples of a battery grid, showing a positive battery grid.
Figure 2:
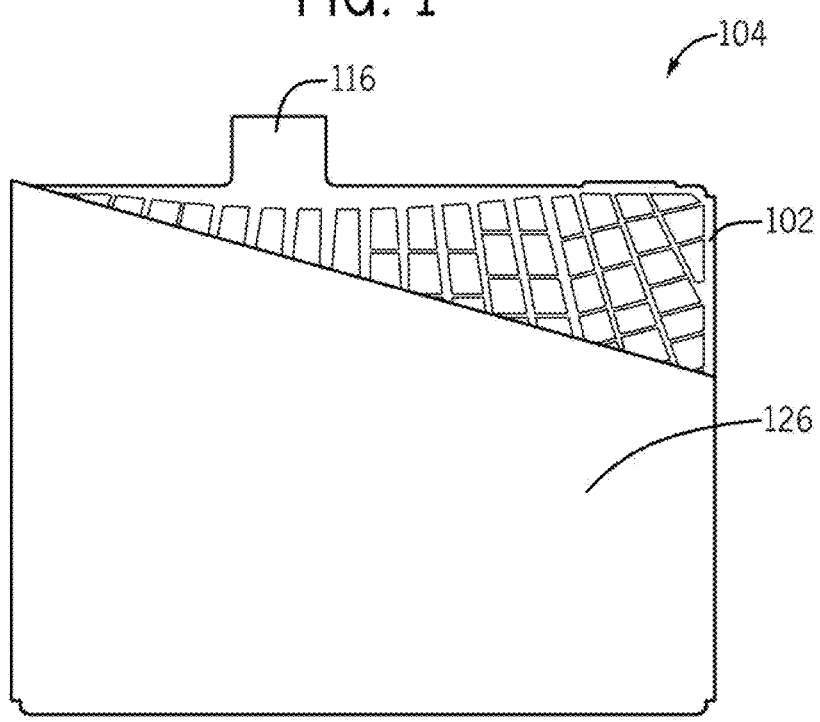
FIG. 2 is an elevational view of a positive plate, including the battery grid shown in FIG. 1, showing the pasting material cut away to reveal the battery grid.

A battery grid 102 is shown in FIGS. 1-3. In one or more examples of embodiments, the grid 102 is a stamped grid. As shown in FIGS. 1-2, the stamped grid 102 is a positive grid provided for use in association with a positive plate 104. In the particular examples provided, the positive battery grid is a flat plate or planar plate.

The grid 102 includes a frame 106. The frame 106 has a top frame element 108, first and second side frame elements 110, 112, and a bottom frame element 114. A current collection lug 116 is integral with the top frame element 108. The lug 116 may be offset from the center of the top frame element 108, or alternatively may be centered or positioned closer to either the first or second side frame elements 110, 112. Accordingly, the battery grid frame has a top, a first side, a second side, and a bottom, wherein the top has a lug.

The top frame element 108 may also include an enlarged conductive section 118, at least a portion of which is directly beneath the lug 116, to optimize current conduction to the lug. The bottom frame element 114 may optionally be formed with one or more downwardly extending feet (not shown) for spacing the remainder of the grid away from the bottom of the battery container.

The battery grid 102 also includes grid wires 120. The grid wires 120 may be provided in a grid network formed by a plurality of grid wires arranged in a pattern 122. The grid network may include one or more grid wires 120 joined to the top frame element 108. The grid network may include one or more grid wires 120 joined to the first side frame element 110. The grid network may include one or more grid wires 120 joined to the second side frame element 112. The grid network may include one or more grid wires 120 joined to the bottom frame element 114. The grid network may also include combinations of the foregoing, such as for example, one or more grid wires 120 joined to the top frame element 108 and the bottom frame element 114; one or more grid wires 120 joined to the top frame element 108 and a side frame element 110 or 112; one or more grid wires 120 joined to the bottom frame element 114 and a side frame element 110 or 112; and/or one or more grid wires 120 joined to the first side frame element 110 and the second side frame element 112; and so forth.

The plurality of grid wires 120 define a pattern 122 including open areas 124 in the grid network and within the frame 106. In other words, a plurality of grid wires are interconnected within each of the frames to create interstices. The open areas 124 help hold the active material or paste 126 (see FIG. 2). As shown in the illustrated example, one or more of the grid wires 120 may increase in cross-sectional area along their length from bottom to top, or have a tapered shape to optimize the current carrying capacity of the wires to help carry away increasing current being generated from the distance furthest from the lug 116 to the distance closest to the lug on the grid 102. The width and spacing of the wires between side elements may be predetermined so that there are substantially equal potential points across the width of the grid 102.

In the example illustrated in FIG. 1, the pattern 122 of grid wires 120 includes radially extending grid wires 128. In particular, a plurality of radially extending grid wires 128 extend from the top frame element 108. The pattern of wires emanates from a radiant point. The radiant point is located outside the boundary of the frame. One or more of the plurality of radially extending grid wires 128 may also be joined with the bottom frame element 114 and/or a side frame element 110 or 112 or both side frame elements. In the illustrated example, one of the radially extending grid wires 130 is also provided in parallel to the side frame elements 110, 112. The remaining radially extending grid wires 128 extend radially from an imaginary intersecting point, namely, the radiant point, on a radius line running through the radially extending grid wire 130 positioned parallel to the side frame elements 110, 112. In the foregoing example, the radially extending grid wires 128 become closer together when moving from a position proximate to the bottom frame element 114 to a position proximate to the top frame element 108, and also become spaced farther apart when moving towards the first side frame element 110 or the second side frame element 112 from the radially extending grid wire 130 positioned parallel to the side frame elements.

Figure 4:
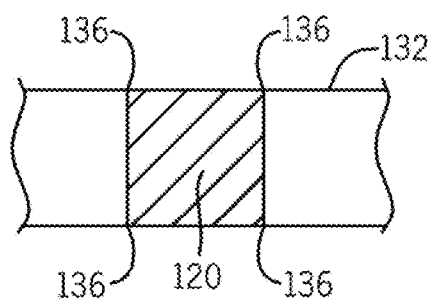
FIG. 4 is a cut away cross sectional view of a grid wire from a stamped battery grid, taken from line 4-4 of FIG. 1, showing one or more alternative examples of a grid wire which includes a primary deformation.

In one or more examples of embodiments, the grid 102 also includes grid cross wires 132. In the illustrated example shown in FIG. 4, the cross wires 132, including for example horizontal grid wires, are spaced apart and may be parallel to the top and/or bottom frame elements 108, 114, although variations thereon may be acceptable for purposes provided herein. For example, one or more of the cross wires may not be equally spread apart or parallel to the top and/or bottom frame elements, such as can be seen in the Figures. The grid cross wires may be provided for a variety of different purposes, one example of which, is to assist in supporting the grid 102 during manufacturing and/or supporting electrochemical paste 126 and/or permitting the formation of paste pellets.

The intersection or joining of a radially extending grid wire 128 and a grid cross wire 132 occurs at a node 134. A plurality of such intersections or coupled grid wires 120 and grid cross wires 132 form a plurality of nodes 134. The combination of radially extending grid wires 128, grid cross wires 132 and nodes 134 form the one or more open spaces 124 in the grid wire network carried by the frame 106.

While a specific grid pattern 122 is illustrated and described for purposes of example, variations thereon, such as but not limited to, grid wire thicknesses and orientation would not depart from the overall scope of the present invention. Likewise, as previously discussed, other types of grid, now known or future developed, such as but not limited to a honeycomb-type grid pattern or rectilinear type grid pattern, may be acceptable for use as the grid described herein.

Any suitable material for accomplishing the purposes provided may be used for the grid material, and in one or more examples of embodiments, the grid material is formed of a lead or a lead alloy. In one or more examples of embodiments, material used for the grid material may impart the characteristic of uniform corrosion to the grid 102. As a result, more efficient use of all of the material of the grid 102 is accomplished. For example, the material may react during the service life of the battery so as to uniformly thin the grid 102 (i.e., corrode) over time. One or more examples of a suitable lead may be a wrought lead or, for instance, one or more highly grain refined alloys.

Referring to FIGS. 4-8, the cross-section of the grid wires 120 and/or nodes 134 may vary depending upon the grid making process. In various embodiments, the grid wires 120 and/or nodes 134 may be reshaped or refinished or deformed, forming a primary deformation of the grid wire. For example, the cross-section of grid wires 120 and/or nodes 134 may be of any cross-section design including substantially oval shaped, substantially rectangular shaped, substantially diamond shaped, substantially rhomboid shaped, substantially hexagon shaped, and/or substantially octagon shaped. It is understood that these terms of shape are used loosely to identify the general cross-sectional shape and that the actual cross-section of a grid wire or node 134 may vary from the stated shape due to, for example, the level of precision in the manufacturing process.

Figure 5:
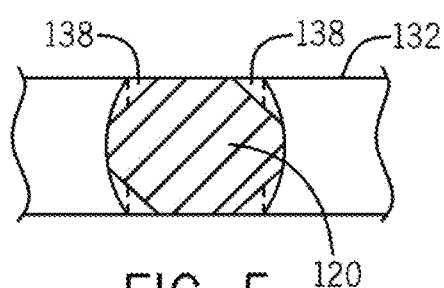
FIG. 5 is a cut away cross sectional view of a grid wire from a stamped battery grid, taken from line 4-4 of FIG. 1, showing one or more alternative examples of a grid wire which includes a primary deformation.
Figure 6:
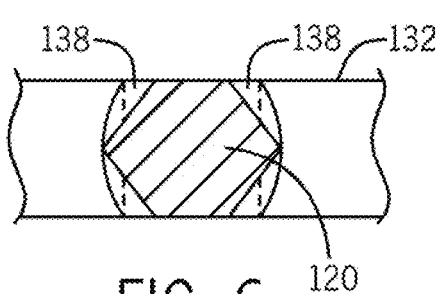
FIG. 6 is a cut away cross sectional view of a grid wire from a stamped battery grid, taken from line 4-4 of FIG. 1, showing one or more alternative examples of a grid wire which includes a primary deformation.
Figure 7:
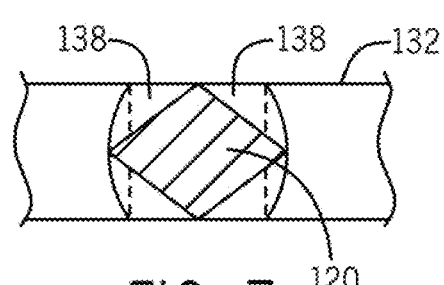
FIG. 7 is a cut away cross sectional view of a grid wire from a stamped battery grid taken from line 4-4 of FIG. 1, showing one or more alternative examples of a grid wire which includes a primary deformation.
Figure 8:
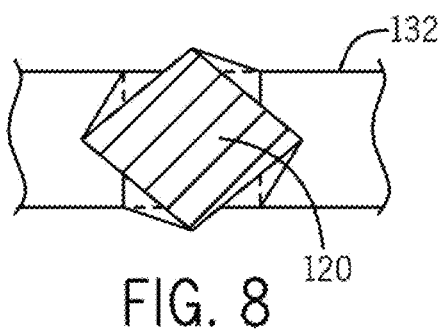
FIG. 8 is a cut away cross sectional view of a grid wire from a stamped battery grid, taken from line 4-4 of FIG. 1, showing one or more alternative examples of a grid wire which includes a primary deformation.

The cross-sectional edges or corners 136 formed by a stamping process (shown in the illustrated example of FIG. 4) may be deformed or recessed inwards or otherwise inset from the original outer edge 136 in FIGS. 5-7. In one or more examples of embodiments, the stamped grids 102 are deformed or reshaped (e.g., Ref 138) such that the hard edges or corners 136 formed by the stamping process are "rounded" or otherwise deformed. In addition to the shaped cross-sectional edge(s) 136, the surfaces of the grid wire may also be smoothed to reduce or eliminate burrs and other surface imperfections.

In the battery grid 102, each grid wire section may have a different cross-sectional configuration, or each grid wire section may have the same or a similar cross-sectional configuration. Depending on the needs, a grid 102 may include these primary deformations 138 at the vertical wires or radially extending grid wires only, the grid cross wires or horizontal wire elements only, or both, as well as, for example the nodes 134 and optionally one or more of the frame elements. The stamping or punching of the grid 102, resulting in the cross-section generally shown in FIG. 4, may also be considered a primary deformation.

Generally, the primary deformation 138 of the grid 102 as described hereinabove is a "minor" deformation of the grid material or grid in that it results in little microstructural change to the grid material. In other words, the grid wires 120 are deformed by a very small amount. These primary deformations 138 create a very small modification in the surface of the grid 102. "Rounding" the cross-sectional corners 136, i.e., reducing the sharpness or angle, reduces the likelihood of cracking, and paste adhesion is also improved. While specific examples are described, it should be appreciated that any number of grid wire and/or node shapes may be utilized which are suitable for manufacturing and product durability, as well as suitable paste adhesion characteristics.

Figure 9:
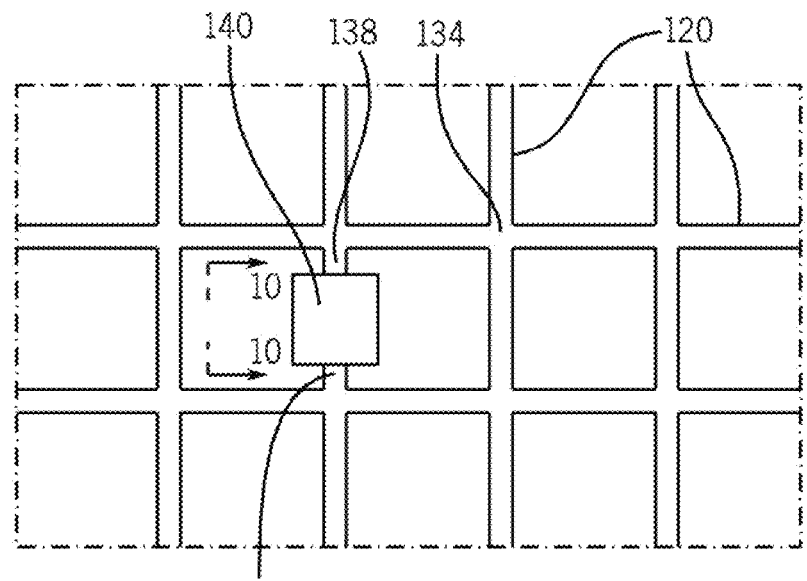
FIG. 9 is a cut away elevation view of a battery grid showing a secondary deformation segment on a grid wire or grid wire segment from a pattern of grid wires.

In various examples of embodiments, a battery grid is provided comprising a grid wire having a first segment with a first corrosion resistance and a second segment with a second corrosion resistance which is less than the first corrosion resistance. The second segment corrodes at a rate which is faster than the corrosion rate of the first segment. In one or more examples of embodiments, a second segment is formed by secondary deformation. To this end, the grid 102 is provided with a secondary deformation 140 (see FIGS. 9-10). A secondary deformation 140, or more than one secondary deformation, is located on a grid wire in an area where the above-referenced properties are desired. A secondary deformation, which can be provided in various forms more thoroughly described hereinbelow, has various effects on the grid, grid wire and corresponding structure. The secondary deformation is, in one or more examples of embodiment, a segment of grid wire selectively located so as to minimize grid growth.

The secondary deformation 140 is a more significant deformation of the lead material than the primary deformation(s). Unlike traditional grid surface treatment, the secondary deformation described herein is a control of, or modification of the corrosion properties of the grid material. That is, the secondary deformation 140 on the selected wires may reduce the mechanical strength of the grid wire to increase the likelihood of corrosion, and/or decrease the corrosion resistance of the grid wire.

More specifically, a secondary deformation 140 includes an amount of change or modification to the grid wire that is greater than the primary deformation, such that the area or segment of grid 102 which includes the secondary deformation 140 will corrode faster, i.e., has a different corrosion resistance, than an area or segment of the grid 102 which does not include a secondary deformation 140. In other words, the grid segment(s), area(s) or piece(s) of grid wire 120 that have or form a secondary deformation 140 will have less corrosion resistance, and therefore corrode through first, or before those segments which do not include, or are not a secondary deformation, as well as those segments with a lesser secondary deformation or which include greater corrosion resistance. In one further example of embodiments, the segment of grid wire may be or have both a primary deformation and a secondary deformation.

Figure 11:
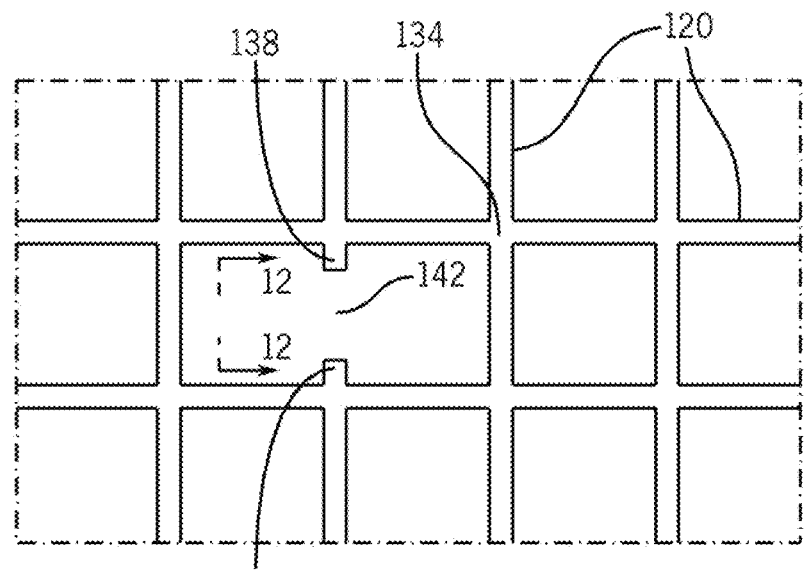
FIG. 11 is a cut away elevation view of a battery grid shown in FIG. 9, showing a gap in a grid wire formed from corrosion of the secondary deformation segment illustrated in FIG. 9.
Figure 12:
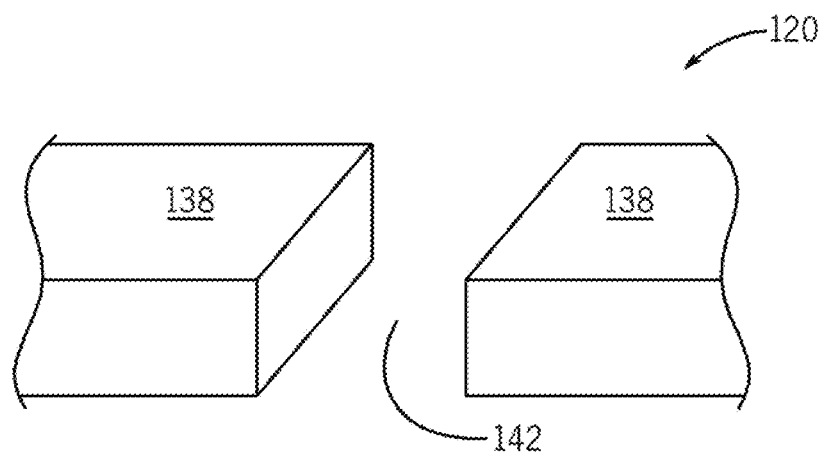
FIG. 12 is a perspective view of a grid wire including the gap shown in FIG. 11, identified by line 12-12 in FIG. 11.

One or more segments of altered corrosion resistance, such as secondary deformation 140, may be used to internally compensate for grid growth. The secondary deformation 140 changes the corrosion resistance and corrosion rate of one or more segments of the grid wire. More specifically, the selected piece or area of the grid 102 with secondary deformation 140 has accelerated corrosion. The reduced corrosion resistance and accelerated corrosion, ultimately during service of the battery, results in a gap 142 (FIGS. 11-12) in the grid wire, creating an opening in the grid pattern 122 within the frame 106. The accelerated disappearance of a selected section of grid wire, e.g., a second section of a grid wire having first and second sections, leaves an opening in the grid pattern for the rest of the grid wires) to grow and/or release the stress over the grid 102. Thus, by selective reduction(s) in corrosion resistance and accelerated corrosion of one or more selected segments of the grid 102, and in particular the grid wires 120, the grid 102 dynamically, through corrosion, creates the extra space necessary to release the internal stresses in the grid dynamically during the actual service of a battery (and grid), and in some instances, during the early period of such service. As internal stresses are dynamically relieved, grid growth that leads to sudden shorts is reduced or eliminated, and the predictability of battery failure is improved.

Areas or segments of modified corrosion resistance or secondary deformation 140 may take one or more, or a combination of a variety of forms. For example, a battery grid including a grid wire may have a first microstructure and a segment with a second microstructure which is different from the first microstructure.

The grid wire microstructure is generally formed of a crystallized structure, wherein metallic atoms in each crystal are well-organized into crystal lattice systems. The microstructure of the grid wire material influences physical properties such as strength, toughness, ductility, hardness, corrosion resistance, high/low temperature behavior, wear resistance, and the like. In one or more examples of embodiments, appropriate microstructure control can be attained by a secondary deformation 140 on selected wires. Secondary deformation 140 of a grid wire segment can include one or more or a combination of changes in the grain structure, re-crystallization and/or changes to material strength and corrosion resistance. Thus, a grid wire segment with a secondary deformation 140 has a different microstructure (e.g., shape and alignment of the microscopic components of the metal) than a grid wire without a secondary deformation. In one or more particular examples of embodiments, the battery grid may comprise grid wires in which one or more first segments have a first microstructure indicative of a first corrosion resistance and one or more second segments have a second microstructure indicative of a second corrosion resistance. The first microstructure may be formed of a first crystallized structure, wherein metallic atoms in each crystal are well-organized into crystal lattice systems. The second microstructure is a second crystallized structure selected from the group consisting of a change in grain structure, a re-crystallization of the first crystallized structure, a change to material strength and/or a combination of the foregoing.

In one example of the foregoing embodiment, a grid wire having a primary deformation 138 has a microstructure with a first grain density, and/or grain direction, and/or grain size and a first corrosion resistance, while a grid wire or grid wire segment having a secondary deformation 140 has a different microstructure with a second grain density, and/or grain direction, and/or grain size and a second corrosion resistance. The microstructure of the secondary deformation 140 includes one or more of the foregoing described properties in a concentration or degree which increases the rate of corrosion of the secondary deformation segment over the rate of corrosion of the grid wire with the primary deformation 138. In this manner, the microstructure may make the segment more susceptible to corrosion.

Microstructure control, and differences in microstructure in a grid 102 and/or grid wire, may be imparted to the grid 102 by any now known or future developed means. For example, a microstructure change may be imparted by a physical change in the grid wire, including, for instance, a variation in the shape of the grid wire, such as shown in FIGS. 10, and 13-16. In one example, a secondary deformation can be both a change in shape and modification of the microstructure of the grid wire to increase corrosion. The segment with a second microstructure may be formed by a physical modification of or difference in the grid wire, a recrystallization of the grid wire material, and/or a heat treatment of the grid wire material. As discussed in greater detail hereinbelow, physical modifications can include variations in shape, size, thickness, density, volume or amount of grid material, and so forth, each of which may impart different properties to the grid wire segment.

In one or more alternative examples of embodiments, the second segment(s), or secondary deformation segment(s), may be frangible relative to the remainder of the grid. In particular, the second segments may be frangible when subjected to the environmental conditions within the battery. Examples of environmental conditions in the battery include: corrosivity of the battery grid; internal stresses resulting from growth of the battery grid within the battery housing; and the like. The second segment may be frangible relative to the remainder of the grid by a lesser corrosion resistance. In one or more alternative examples of embodiments, the second segment is frangible relative to the remainder of the grid by a difference in physical properties, i.e., the first segment and the second segment have a difference in physical properties that creates the difference in corrosion resistance. The difference in physical properties may be any one, or a combination of: a difference in microstructure; a difference in thickness; a difference in shape; a difference in density; a difference in heat treatment; and the like.

Figure 10:
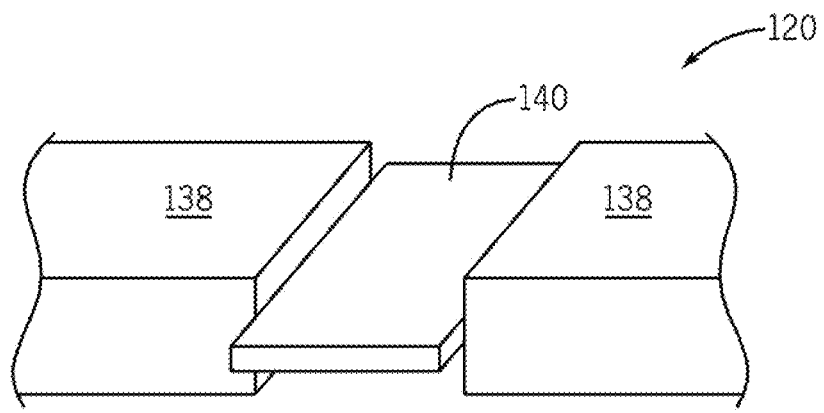
FIG. 10 is a perspective view of a grid wire including the secondary deformation segment shown in FIG. 9, identified by line 10-10 in FIG. 9.

Generally, a grid 102 may be provided with a secondary deformation 140 having a pre-selected shape. Each secondary deformation 140 may be selectively shaped and/or sized for a desired effect, i.e., corrosion resistance, corrosion rate and size of area of corrosion. Both the shape of the deformation and the length of the deformed section may be controlled. By changing the shape of the grid wire, the corrosion resistance or rate of corrosion may be increased or decreased accordingly. More specifically, in one or more examples of embodiments, a grid wire or grid wire segment 120 which is either not deformed or includes a primary deformation 138 is provided including a first cross-section with a first shape, width, size, and density. The grid wire may also include a grid wire segment with a secondary deformation 140. The secondary deformation 140 is positioned on a grid wire having a primary deformation 138, and/or may be positioned between primary deformation 138 grid wire segments or areas. In the illustrated examples, the secondary deformation segment 140 is illustrated with a different shape and cross-sectional width than the primary deformation 138 grid wire segment(s). As can be seen in FIG. 10, the secondary deformation 140 in this illustrated example is formed in an approximate flattened rectangular shape. The secondary deformation 140 has a narrower cross-section and a greater lateral width than the grid wire with a primary deformation 138 or no deformation. The secondary deformation segment 140 may be in a plane which is parallel with, and for example between, the outer surface(s) of the grid wire. Optionally, the secondary deformation 140 may be spaced from the outer surface of the grid wire, such as for example, being inset from the outer surface or may be made non-planar.

Figure 13:
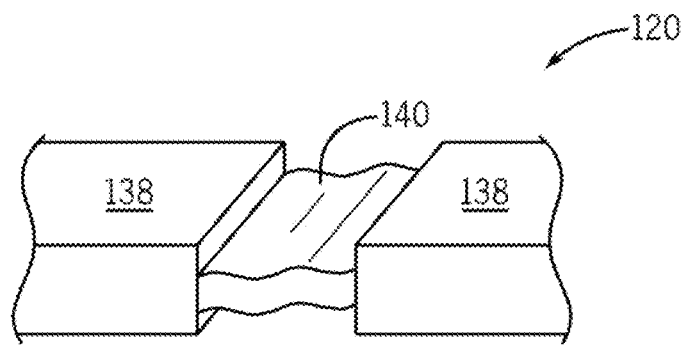
FIG. 13 is a cut away perspective view of a grid wire from a grid wire pattern on a battery grid, showing one or more alternative examples of a secondary deformation segment.
Figure 14:
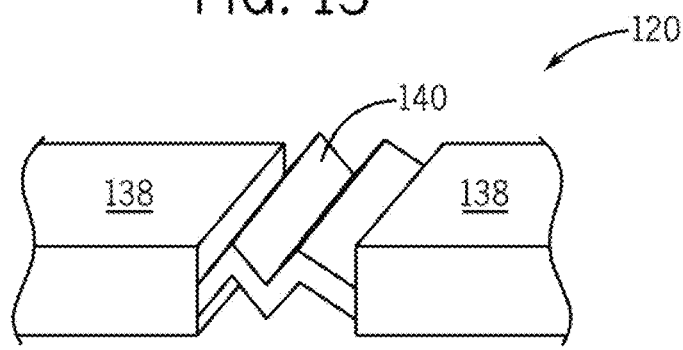
FIG. 14 is a cut away perspective view of a grid wire from a grid wire pattern on a battery grid, showing one or more alternative examples of a secondary deformation segment.
Figure 15:
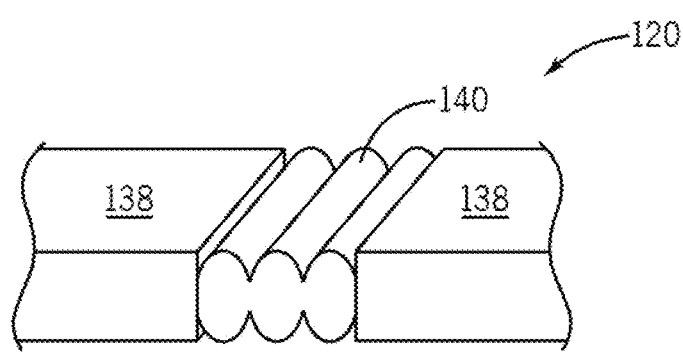
FIG. 15 is a cut away perspective view of a grid wire from a grid wire pattern on a battery grid, showing one or more alternative examples of a secondary deformation segment.
Figure 16:
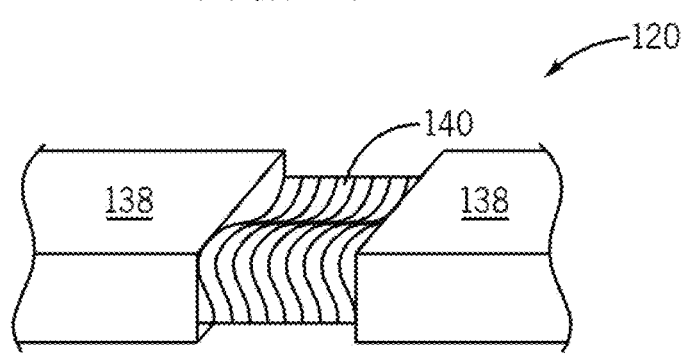
FIG. 16 is a cut away perspective view of a grid wire from a grid wire pattern on a battery grid, showing one or more alternative examples of a secondary deformation segment.

Alternative shapes and dimensions having the secondary deformation characteristics are also acceptable. Various physical and non-physical processes can be used to create the secondary deformation and thus create a resultant shaped secondary deformation segment 140 such as, for instance, metal twisting, gear rolling, serrated pressing, and other suitable processes, examples of which are indicated in FIGS. 10, and 13-16. As shown in FIGS. 13-16, the secondary deformation 140 is illustrated as having a different (e.g., more severe) physical secondary deformation than the secondary deformation shown in FIG. 10, such as an approximate wavy surface (FIG. 13) or an approximate serrated surface, e.g., including approximate sharp peaks and valleys (FIG. 14). The secondary deformation segments 140 in the illustrated examples of FIGS. 13 & 14 are off the grid plane on both sides. FIG. 15 illustrates a secondary deformation segment 140 having one or more rounded peaks separated by valleys. FIG. 16 illustrates a secondary deformation segment 140 which includes a twisted or otherwise non-uniform segment of secondary deformation.

The secondary deformation may also be located on one side or face of the grid wire, or more than one side. In one example, the secondary deformation is located on opposing faces of the grid wire. In one further example of embodiments, the secondary deformation may be a segment of the grid wire which is pushed out of the plane of the planar grid.

The secondary deformation segment 140 may also be a grid wire segment 120 including less grid material than the grid wire, or primarily deformed grid wire, so that the segment corrodes at a rate which is faster than the corrosion rate of the grid wire. The segment 140 including less grid material may be formed by removal of material from the grid material, or for example, may be a perforated segment of grid material. Likewise, the segment including less grid material may be a segment in which the grid material is less dense, or has a different density, than the grid material forming the grid wire 120.

The secondary deformation segment 140 may be a heat treated segment of grid wire. For example, a section of grid wire may be or include a layer, such as a surface layer which has been melted and re-solidified. A heat treatment may change the microstructure for the selected grid wire.

In addition to a selected shape of deformation, the secondary deformation segment 140 may be provided with a particular degree of deformation, such as for example, more or less deformation, or more or less microstructural change of the grid wire 120. Generally, with regard to physical deformation, the physical shape of the deformation and the amount of grid material, namely lead, which is moved from the original grid wire form provides the degree of deformation. As an illustrative example, one grid wire or grid wire segment may be formed having a greater thickness, or in the alternative, a lesser percentage of deformation, as compared to another segment of grid wire on the same grid. Additionally, multiple secondary deformations 140 on the same grid 102 may be provided with differing thicknesses, depths, or degrees of deformation.

Figure 17:
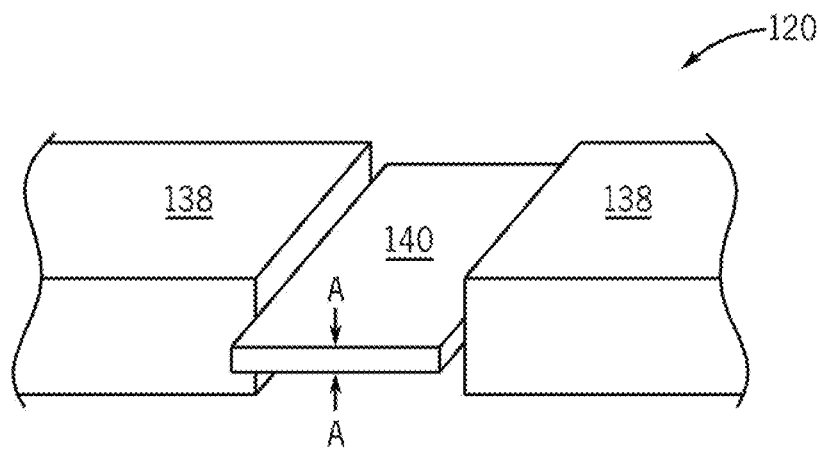
FIG. 17 is a cut away perspective view of a grid wire from a grid wire pattern on a battery grid, showing one or more alternative examples of a secondary deformation segment having a degree of deformation.
Figure 18:
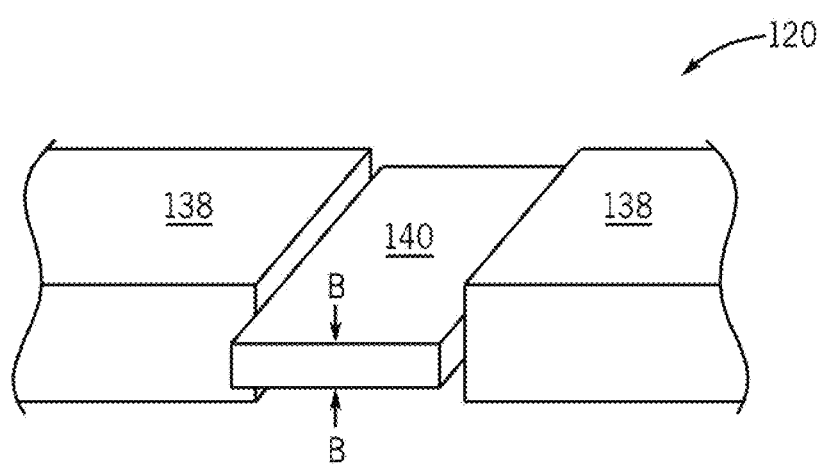
FIG. 18 is a cut away perspective view of a grid wire from a grid wire pattern on a battery grid, showing one or more alternative examples of a secondary deformation segment having a degree of deformation which is less than the degree of deformation shown in FIG. 17.
Figure 19:
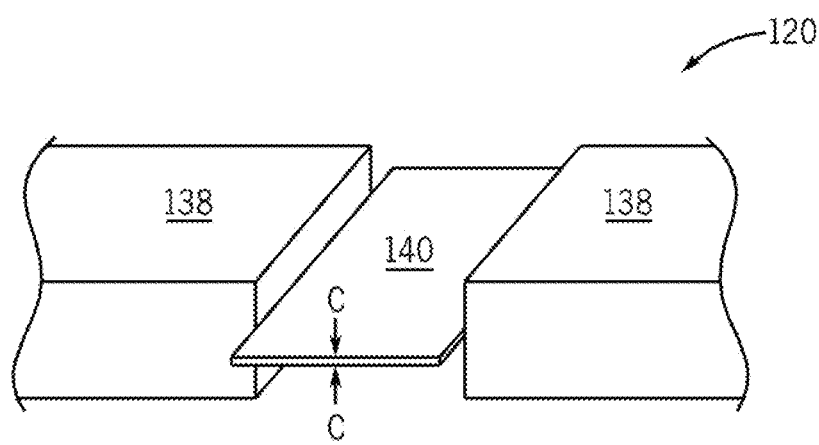
FIG. 19 is a cut away perspective view of a grid wire from a grid wire pattern on a battery grid, showing one or more alternative examples of a secondary deformation segment having a degree of deformation which is more than the degree of deformation shown in FIGS. 17 & 18.

FIGS. 17-19 illustrate one or more examples of embodiments of secondary deformation segments 140 having differing degrees of deformation. Comparing FIGS. 17, 18, and 19, as can be seen in this example, secondary deformation is characterized by the physical differences of the secondary deformation segment 140 and the primary deformation 138 segments on the original grid wire 120. The respective secondary deformation segments 140 differ from each other in degree, illustrated simplistically for purposes of example in the Figures by thickness variation. For example, the secondary deformation segment 140 in FIG. 17 has been deformed to a greater degree or extent (identified by line A-A) than the secondary deformation segment 140 in FIG. 18 (identified by line B-B), but to a lesser degree or extent than the secondary deformation segment 140 in FIG. 19 (identified by line C-C). Likewise, the secondary deformation segment 140 in FIG. 19 (line C-C) is deformed to a greater degree or extent than the secondary deformation segment 140 in FIG. 18 (line B-B).

Accordingly, the secondary deformation segment 140, such as that illustrated in FIGS. 17-19, may be provided with a range of thicknesses. In one or more examples of embodiments, the secondary deformation segment 140 may differ from the original grid wire or primary deformation 138 by a value greater than zero (0)— zero being no deformation from the original grid wire or from the primary deformation 138. More specifically, the secondary deformation segment 140 may have a range of deformation or difference in thickness from the primary deformation 138 or original grid wire thickness based upon the initial grid thickness.

Similarly, the secondary deformation 140, regardless of the type of secondary deformation, may have a degree of deformation greater than zero (0). For example, any amount of secondary deformation greater than approximately 3~5% may provide the desired properties, such as a change in the microstructure and/or mechanical properties of the grid wire, and there is no upper limit on the deformation applied, with a 100% degree of deformation being the complete cutting of the grid wire. More preferably, the secondary deformation 140 may have a degree of deformation or range of thickness variation (between the final grid wire thickness and the initial grid wire thickness) expressed as a percentage ranging from 3% to 95%, and even more preferably, may have a degree of deformation ranging from 30% to 80%, the percentage (%) of deformation being generally the difference amount of deformation as compared to the original grid wire or primary deformation 138.

As indicated, an area or segment of secondary deformation 140 or piece of grid wire containing a secondary deformation has a different corrosion resistance than the primary deformation 138 grid wire sections, generally corroding through first, before the original or primary deformation grid wire sections during the normal service life of a battery. Moreover, the degree of deformation has a direct correlation to the corrosion resistance, and thus amount of corrosion that may occur. That is, the increased corrosion rate is dependent on the amount of the secondary deformation 140. The more deformation, the faster corrosion the selected wires incur. To this end, there may be more than one different degree of corrosion on the grid.

As discussed, the secondary deformation 140 or area of predetermined or differing corrosion resistance may be selectively located on the grid 102 and on a selected grid wire 120. The secondary deformation 140 may be provided on radially extending grid wire 428 and/or cross wires 132. A grid 102 may be provided having one, or more than one, secondary deformation segment 140 or area of differing corrosion resistance. For example, a plurality of second segments may be provided on the grid. The secondary deformation or plurality of secondary deformations may also be on one side of the grid wire or may be on more than one side of the grid wire. For example, the secondary deformation may be on opposing faces of the grid wire in identical positions or varied positions.

While it may be desirable for some grid wires 120 to break or corrode, it may not be desirable to have certain grid wires 120 break or corrode. In one or more examples of embodiments, the secondary deformation may be used to optimize the effects of corrosion resistance or secondary deformation to achieve stress relief of the grid 102. The grid 102 also may avoid sudden failure while retaining the efficiency of uniformly corroding lead.

Thus, the grid 102 may be specifically designed to internally compensate for grid growth, compensating for such growth by selectively locating one or more areas of differing corrosion resistance or secondary deformation 140, as well as, or in the alternative, by the degree of corrosion resistance or the secondary deformation 140 in the grid wire 120, which in turn, affects the location and the timing in which a grid wire will corrode, leaving an opening or gap 142 focusing or permitting grid growth or expansion in that gap 142. For example, in FIGS. 9-10 secondary deformation segment 140 on the grid wire 120 corrodes away earlier than other grid wires which may include primary deformations 138. This process results in the grid section shown in FIGS. 11 and 12, which illustrates a gap 142 in place of the secondary deformation segment 140. As the grid wires 120 grow during the natural service life of the battery, the grid wires 120 may grow into the space created by the gap 142.

One or more examples of secondary deformations 140 are described herein as useable in manipulating the corrosion behavior of a grid material. While specific examples are provided, alternative methods of changing corrosion behavior may be used without departing from the overall scope of the present invention, such as but not limited to, altering corrosion behavior through use of different alloys having different corrosion behaviors in a battery, or other chemical formulations or variations, in segments or portions of the grid 102.

The various examples of embodiments of a grid as described herein may be used in a battery, and in particular a rechargeable battery. To this end, the battery described herein may include, but is not limited to, a stamped, positive battery grid of the type described having a frame with a top, a first side, a second side, and a bottom, wherein the top has a lug, and further wherein a plurality of grid wires form a pattern within the frame and means for selectively corroding the grid wires during its service life to minimize grid growth. Other grid types are also acceptable for use with the embodiments described herein.

The battery may be used or provided for any suitable purpose. One or more particular examples include a vehicle, such as automobiles, motorcycles, buses, recreational vehicles, boats, golf carts, and the like.

Figure 20:
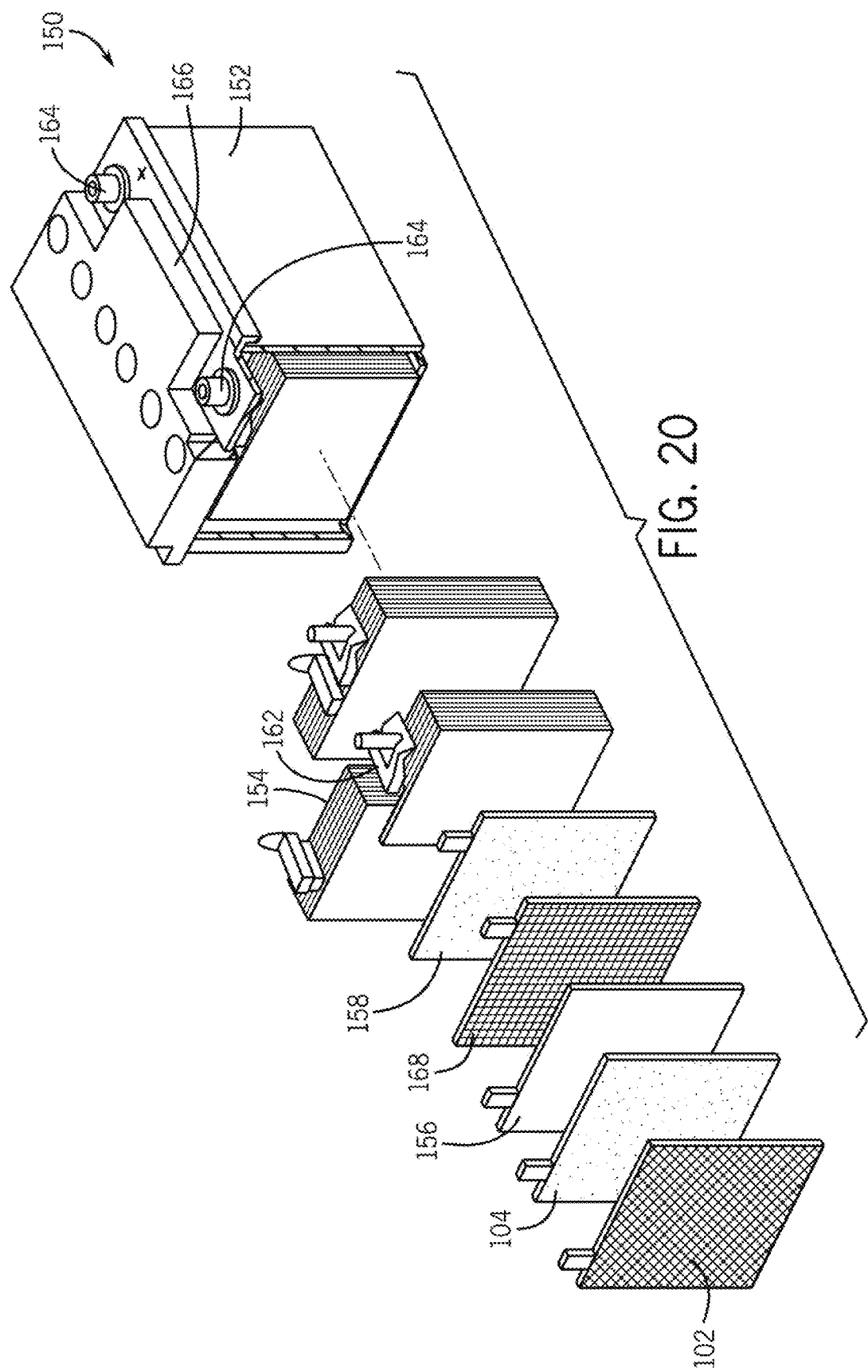
FIG. 20 is an exploded perspective view of one or more examples of a battery for use in association with a battery grid as shown in FIG. 1.

A battery 150, shown in an exploded view in FIG. 20, is configured to provide at least a portion of the power required to start or operate the vehicle and/or various vehicle systems (e.g., starting, lighting and ignition systems). Further, it should be understood that the battery may be utilized in a variety of applications not involving a vehicle, and all such applications are intended to be within the scope of the present disclosure.

The battery 150 shown in FIG. 20 may include any type of secondary battery (e.g., rechargeable battery). According to one or more examples of embodiments, the battery 150 is a lead-acid storage battery. Various embodiments of lead-acid storage batteries may be either sealed (e.g., non-maintenance) or unsealed (e.g., wet). According to one or more examples of embodiments, the lead-acid storage battery 150 is an unsealed lead-acid battery and periodically requires the addition of electrolyte and/or water to maintain a desired volume and/or concentration of either or both. The battery, in one or more alternative examples of embodiments, may be of the SLI-type. The battery may alternatively be an absorbed glass mat battery. While specific examples are described and illustrated, any suitable secondary battery may be acceptable for the purposes provided.

The lead-acid storage battery 150 includes several cell elements which are provided in separate compartments of a container or housing 152 containing electrolyte, such as aqueous sulfuric acid. A cover 166 is provided for the housing 152, and in various embodiments, the cover includes terminal bushings and fill tubes to allow electrolyte to be added to the cells and to permit servicing. To prevent undesirable spillage of electrolyte from the fill tubes, and to permit exhausting of gases generated during the electrochemical reaction, a battery housing or cover may also include one or more filler hole caps and/or vent cap assemblies.

The illustration provided herein for purposes of example relates to automotive applications, wherein groups of 8-20 plates are used in each of six stacks or plate sets 154, both positive and negative, for producing a standard automotive 12-volt battery. Each plate block 154 may include one or more positive plates 104 and one or more negative plates, each having a lug 116. Separator material 156 (see FIG. 3B) is provided between each positive plate 104 and negative plate. A plurality of plate blocks or chapters or cells 154 are connected in series according to the capacity of the lead acid storage battery 150. In other applications, anywhere from 6 to 31 plates may be used in a stack. The number of stacks or chapters or plate sets 154 may be varied as well. It will be obvious to those skilled in the art after reading this specification that the size and number of plates in any particular stack (including the size and number of the individual grids), and the number of stacks used to construct the battery may vary widely depending upon the desired end use.

One or more positive and one or more negative terminal posts 164 may be provided. Such terminal posts 164 typically include portions which may extend through the cover 166 and/or housing 152, depending upon the battery design. The terminal posts may also extend through a terminal post seal assembly to help prevent leakage of acid. It will be recognized that a variety of terminal arrangements are possible, including top, side or corner configurations known in the art. One or more cast-on straps 162 which electrically couple the lugs 116 in a plate set and the respective plate sets may also be provided.

Figure 3A:
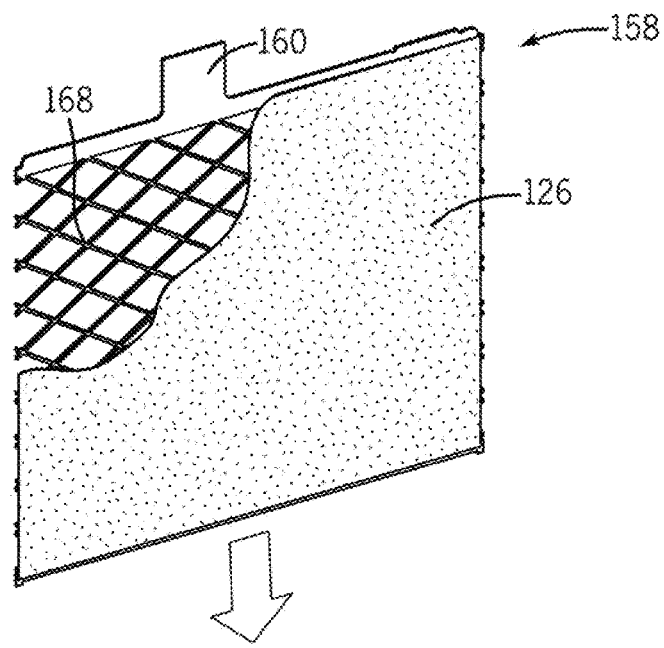
FIG. 3A is a perspective view of a negative plate, showing the pasting material cut away to reveal a negative battery grid.

As indicated, the battery 150 includes a positive plate 104 (FIG. 2) and a negative plate 158 (FIG. 3A). Each plate 104 includes a lead or lead alloy grid 102 that supports an electrochemically active material. In the illustrated examples of embodiments, the positive and negative plates 104, 158 are paste-type electrodes. The paste-type electrode includes the grid 102 as described herein which forms a substrate and an electrochemically active material or "paste" 126 provided on the substrate. The grids, including a positive grid 102 as described in detail herein above, and a negative grid 168, provide an electrical contact between the positive and negative active materials or paste 126 which serves to conduct current.

A plate 104 for a lead-acid battery is conventionally made by applying active material or paste to a conductive support such as lead alloy grid 102. Plates and grids can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids 102 described herein may be produced using other known or later-developed processes. For example, as discussed above, the substrate may be formed by a casting process (e.g., by pouring a melted alloy into a mold), a stamping process, or by continuous rolling. In one or more examples of embodiments, the battery grid 102 may be produced as part of an automated battery plate making process including grid stamping. To this end, a conventional lead or lead alloy battery grid material is melted and continuously cast to form a continuous strip of grid material, which grid material may be provided or formed into a roll. For example, the grid material strip is coiled up on a coil.

The grid material may be a raw strip. The continuous strip may be rolled to modify thickness or grain structure of the grid material. A series of successive rollers may be used to reduce grid strip thickness. The strip is then punched, such as, but not limited to, in a progressive punching operation, to form a series of interconnected battery grids which have a frame 106 composed of one or more frame elements that surround a network of grid wires 120 forming a pattern 122. In the progressive punching operation, a series of punching steps occur on the grid to remove grid material and form the complete battery grid, including grid wires, nodes and openings therein.

More specifically, the method includes the steps of forming grid material out of a strip of material, such as by stamping or punching, to form a strip of interconnected battery grids 102. Each interconnected battery grid includes a grid network forming a pattern 122 bordered by opposed top and bottom frame elements 108, 114 and opposed first and second side frame elements 110, 112. The grid network or pattern 122 has a plurality of spaced apart grid wire elements defining a plurality of open spaces in the grid network. The punching or stamping of the grid material results in an approximately rectangular or square cross-section of the metal grid wires 120 and nodes 134 in the grid 102.

During or following the punching or stamping process, the grid pattern 122 or network may be deformed in a first or primary deformation step to modify or change the shape of the cross-sectional corners 136 of the grid wires. More specifically, during the manufacture of the grids 102 the grid wires 120 may be refinished or reshaped. In various embodiments, at least one portion of one or more grid wires is deformed, dulled, beveled or rounded after stamping, casting, and/or continuous rolling of the grid. Suitable devices to deform the grid wire(s) include, but are not limited to, a die, a gear driving press, a mechanical press, a hydraulically driven press, and other like devices. In one or more examples of embodiments, the grid wires may be primarily deformed in a stamping station. In particular, the battery grid 102, or strip of battery grids, or continuous strip of said grids, is subjected to a precision stamping operation in a work piece or die in which the grid material is subjected to a sufficiently high stress or force to induce plastic flow on the surface of the material or otherwise plastically deform the grid frame elements, reducing surface grain size, hardening the surface, and permitting deformation or reshaping according to the shape of the die. As shown in FIGS. 5-8, the primary deformation operation or step results in a grid 102 having deformed cross-sectional corners and/or edges 136.

A secondary deformation step is also performed on the grid 102 or the grid wires, and in particular on selected segments of the grid wires 120. In one example, a secondary deformation step may occur following the primary deformation step. In the alternative, the secondary deformation step and primary deformation step may occur simultaneously. The secondary deformation, in one or more particular examples of embodiments, is formed by a stamping iteration after an initial stamping to form the grid. That is, for example during the progressive punching operation, in which a punching step of the operation may be a process which imparts a secondary deformation on the grid wire(s).

The secondary deformation step may more significantly deform a targeted section or location of the grid 102, and specifically a piece of grid wire, to form a secondary deformation segment 140. In the examples described, the grid wires of the positive battery grid plates have a secondary deformation imparted upon the grid wires at one or more pre-selected locations. In one or more examples, the second segments, or secondary deformation segments, are selectively located so as to minimize grid growth.

In one or more examples of embodiments, the secondary deformation method or step modifies selected wires in grids 102 for selective or controlled degradation of the grid or selected variations in corrosion resistance, with any suitable technique for imparting the characteristics described herein. Any known or future developed process or combination of processes may be used to accomplish the secondary deformation step. The secondary deformation step may occur in any suitable device, as will be discussed in further detail hereinbelow.

The desired level or corrosion resistance may be accomplished by, or secondary deformation step may be performed by, in one instance mechanical means. Accordingly, the secondary deformation step may occur by physical modification of the grid wire segment. For instance, appropriate microstructure control can be attained by secondarily deforming the selected wires using suitable metal working techniques as part of the grid manufacturing process, including simple pressing with flat die, fine blanking press, stamping, coining, twisting, pressing, impression die forging, gear rolling, skew rolling, rolling forging, heading, and the like. Likewise, cutting of the grid wire, up to and including cutting entirely through the grid wire (e.g., 100% deformation) may be a form of secondary deformation. Accordingly, in one or more examples of embodiments, the secondary deformation step can be conducted using a coining die, a fine blank pressing which includes a hardened die punch (e.g., flat surface), a hardened blanking die (e.g., flat surface), and a guide plate of similar shape/size to the blanking die. The secondary deformation step includes the application of pressure by the tool which deforms the segment of grid wire or otherwise changes the microstructure of the segment. The amount of work to be applied in order to secondarily deform the grid wire can be calculated using the percentage of the thickness reduction desired. A counter pressure may also be applied to the grid wire or grid wire segment, although a simple pressing process may be used without the counter pressure. The resultant deformed wires according to this process show flat surfaces, as indicated in FIG. 10.

In one or more specific examples of embodiments of physical processes, the strip of grid material is punched or stamped to form the grid 102 in a die. The stamped grid, having a first degree of deformation or primary deformation 138 caused by the stamping or punching process, is subjected to a secondary deformation step in the die, where a segment of the grid 102 is pressed, resulting in plastic deformation of the metal segment, to a second degree of deformation, or corrosion resistance, forming the secondary deformation segment 140.

In one or more alternative examples of embodiments, micro-stamping/coining can be used to deform the selected wires 120. In this instance, the surfaces on the punch and/or the die may be serrated to provide an alternative form of secondary deformation (as compared to a deformation process which results in flat surfaces), including for example, a more severe secondary deformation 140. Moreover, the resultant deformed wires may be modified such that they are off the grid plane on both sides, as shown in FIGS. 13-14. Skew rolling/rolling forging may also be used. These processes reduce the cross sectional area and change the shape of the grid wire segment while the selected wires are passed through a pair or set of grooved rolls of different shapes. FIG. 15 demonstrates one or more examples of the shape of the resultant deformed wires formed by this secondary deformation process. Severe plastic deformation (SPD) can also be used to complete the secondary deformation step on selected wires. As indicated above, other physical processes to deform single selected grid wires 120 include, metal twisting, gear rolling, serrated pressing, etc. Examples of resultant secondary deformation segments 140 or deformed wires and shapes are indicated and illustrated simplistically in FIGS. 10, 13-16.

In addition to the physical metal working deformation techniques previously described, the secondary deformation step may also be accomplished and areas of differing corrosion resistance formed by perforation of the grid wire 120. In one or more examples of embodiments, a grid 102 having one or more areas of perforation on selected wires may be used to alter the corrosion rate of the selected wires. Perforation may be varied, such that selected segments or grid wires 120 may have different density or amounts of perforation. Perforation of the grid wire can be accomplished by any suitable known or future developed process. In one or more alternative examples of embodiments, perforation may include punching small holes in selected grid wires 120. The hole diameter(s) and the density of the hole(s) along the grid wires 120 can be varied in order to accomplish the desired corrosion pattern. Perforation of the grid wire may also be accomplished by an operation of one or more die cutting processes, punching a number of holes in the grid wires. While perforation is specifically described, other now known or future developed means may also be used for removing material from the grid wire to form the secondary deformation segment. Likewise, the grid may be formed having less grid material in one or more strategic locations of the grid.

A heat treatment, such as a laser, may also be used to apply or create an area having a different corrosion resistance or secondary deformation 140 in the grid wire or grid wire segment, as well as a pattern of such segments. In particular, a laser may create or cause a heat effect on the grid 102. That is, deformation of the grid 102 occurs by heat treatment, which results in heat modification of a grid wire segment, forming a secondary deformation. In one or more examples of embodiments, a laser may be applied to melt and re-solidify the surface layer of the grid, such as, for example by selective laser melting. In such techniques, a high power laser beam (e.g., a ytterbium fiber laser) is used to change the microstructure for the selected grid wires. This treatment results in an increase or decrease in the corrosion resistance, and modification (e.g., increase or reduction) in the recrystallization of the grid wire. While various examples are specifically described herein, other methods of imparting heat treatment and other methods of providing areas of varied corrosion resistance or secondary deformation 140 to a grid wire include, but are not limited to, particle bombardment; CNC Machining such as, but not limited to, water jet; vacuum forming or inverse pressure, high pressure air; arcs; sputter pumps; and the like.

In accordance with the foregoing, the secondary deformation imparts a difference in shape in the battery grid and in particular the grid wire. In an alternative example of embodiments the secondary deformation imparts a difference in thickness; a difference in density; a difference in heat treatment; a perforation; and the like.

In addition to the foregoing secondary deformation processes, the timing of the secondary deformation step may be varied to accomplish a desired microstructural change or degree of corrosion resistance. The secondary deformation step of the selected wires 120 in grids 102 can be completed, such as for example continuously, at any time before pasting the plate 104 in a pasting production line, simultaneously with the punching of the grid, and/or after the grid punching in the punching production line. Accordingly, in one or more examples of embodiments, a "fresh" strip of grid material may be used. In the alternative, the secondary deformation step may occur later in the process on an "aged" (and in some instances hardened) strip of grid material. For instance, the grid 102 may be subjected to a secondary deformation step on a pasting line of the manufacturing process, such as by a machine adapted to produce the secondary deformation added to the line. In one or more examples of embodiments, a grid material is selectively aged or the secondary deformation step is delayed in the grid forming process in order to accommodate a selected or desired degree of microstructural change. In one further example of embodiments, the secondary deformation is formed in a stamping iteration after an initial stamping.

Following the primary and secondary deformation steps, the active material or paste 126 is then applied to or otherwise provided (e.g., pasted by a conventional paster) on the grid 102. The grids 102 with selected wires including a secondary deformation 140 can be pasted continuously. In various embodiments, one or more pasting materials or pasting papers (not shown) may be provided on one or both surfaces of the active material. In various embodiments, the pasting materials or paper may be provided in a continuous process.

The grids 102, active material and pasting material or paper may be fed to a divider where the strip is cut into plates 104. Accordingly, each of the grids 102 is cut to form a plurality of battery grids. Plates 104 cut from the strip may be flattened or otherwise modified to help smooth out any uneven regions of paste. In various embodiments, the plates 104 passes (e.g., on a conveyor) through an oven for flash-drying, and may then be stacked for later use. Conventionally, flash-drying may be performed using an open gas flame or an oven, e.g., as a 10-15 second drying of the plates 104 in a conventional blast drying oven at about 260 deg C. (about 500 deg F.). After drying, the battery plates 104 undergo a chemical treatment, well known to those skilled in the art. The pasted plates 104 are next typically cured for many hours under elevated temperature and humidity to help oxidize any free lead and otherwise adjust the crystal structure of the plate 104.

Figure 3B:
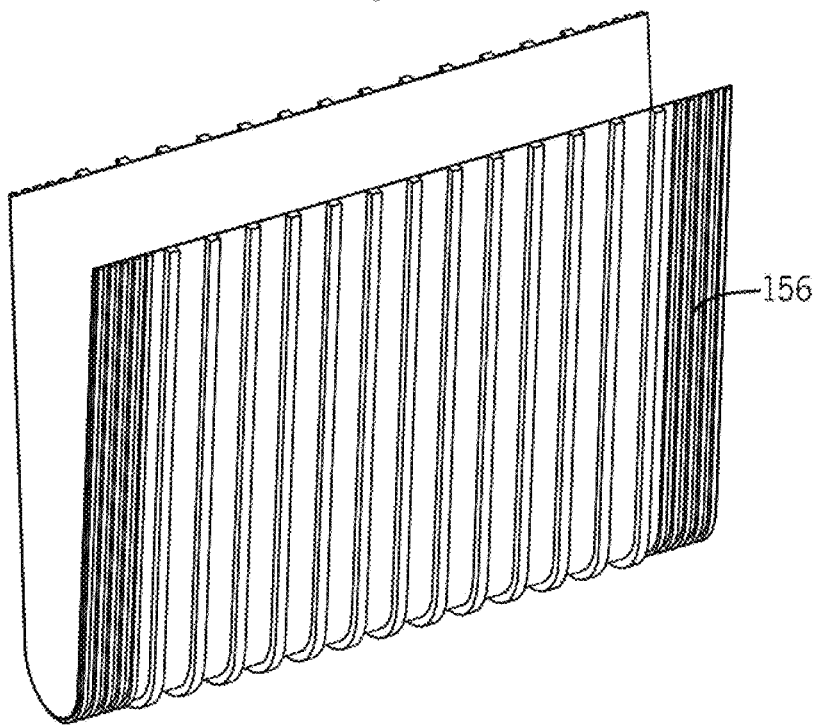
FIG. 3B is a perspective view of a separator for use with a battery plate, such as in one or more examples of embodiments, the negative plate shown in FIG. 3A.

After curing, the plates 104 are assembled into batteries. Groupings of individual battery plates 104, and thus a plurality of grids or stamped grid plates, may be assembled, enveloped, interleaved or otherwise separated with separator material 156 (see e.g., FIGS. 3A-3B, showing separator material 156 in association with a negative plate 158), and provided together to form plate sets 154. Positive battery grid plates alternate with negative battery grid plates and are interleaved with separators to form a stack. The stack fits within the battery housing. For example, in one common battery design, every other plate (e.g., each negative plate 158) in the battery 150 is inserted into a battery separator 156 in the form of an envelope. The envelope acts as a separator between the plate in the envelope and the adjoining plates in the battery plate set 154. The plate sets 154 are assembled in a container 152 to help form the battery 150. The positive battery grid plates alternate with negative battery grid plates and are interleaved with separators to form a stack. The stack fits within a battery housing.

During assembly, the positive lugs 116 of the battery plates 104 are coupled together and the negative lugs 160 (FIG. 3A) of the battery plates 158 are coupled together. This is typically accomplished using cast-on straps 162 formed by taking assembled battery stacks 154, inverting them, and dipping the lugs into molten lead provided in a mold. To permit current to flow throughout the battery, cast-on straps 162 of stacks are joined or coupled. Moreover, terminal electrodes 164 are provided which extend through the cover 166 or casing 152 to permit electrical contact with a vehicle's electrical system or other system requiring or intended to use battery power.

A battery housing 152, including the cover 166, is provided containing the battery cells. In one or more examples of embodiments, the battery housing 152 is submerged in acidic electrolyte fluid in order to fill the battery housing with electrolyte fluid through the fill tube holes in the battery cover. After filling the battery housing with electrolyte fluid, the battery 150 is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the battery 150 is electrochemically formed by passage of current to convert the lead sulfate or basic lead sulfate(s) to lead dioxide positive plates) or lead (negative plates). This is referred to as the "formation" process.

After the electrodes are prepared and placed in a battery, the battery 150 is charged. As it is charged, the positive electrode active material is converted from lead sulfate; lead oxide to lead dioxide.

EXAMPLES

The following Examples are an illustration of one or more examples of embodiments of carrying out the invention and are not intended as to limit the scope of the invention.

Example 1

The following presents an illustrative example of the degree of secondary deformation or corrosion resistance and its effect.

A bare (uncoated) stamped battery grid formed of wrought lead is provided. A fifty percent (50%) secondary deformation of a grid wire is provided on the stamped battery grid. That is, deformation of the grid wire is such that it varies from its original stamped shape by fifty percent (50%). The deformation is accomplished by a press which modifies the shape and thickness of a segment of the grid wire. The fifty percent secondary deformation corresponds to a resultant first accelerated corrosion rate or corrosion resistance. Note, the corrosion rate is accelerated in relation to a grid wire not subject to a secondary deformation. A thirty-five percent (35%) secondary deformation is also provided and accomplished according to the same general process. The thirty-five percent secondary deformation corresponds to a resultant second corrosion resistance, or an accelerated corrosion rate which is faster than the corrosion rate of a grid wire not subject to a secondary deformation, but is slower than the fifty percent secondary deformation accelerated corrosion rate.

Testing and Results. A preliminary corrosion test of battery grids was performed. A first grid having selected grid wires completely removed was compared to a control grid. The control grid included the same pattern of grid wires as the first grid formed by the same process, but all grid wires were intact. Both the first grid and the control grid were subjected to identical conditions which caused the grid material to corrode. A second grid including approximately fifty percent (50%) secondary deformation was also subjected to the same conditions under the same test with the control grid. A third grid including approximately thirty five percent (35%) secondary deformation was also subjected to the same conditions under the same test with the control grid. Battery grids according to the foregoing were subjected to testing at a temperature of 75° C. and had an electrolyte or acid specific gravity of 1.280. A potential was applied of 1.35 Volts with respect to a $Hg/Hg_2SO_4$ reference electrode.

The percent deformation may be calculated in at least two ways. For a straight compression of the grid, which in effect may be simply a reduction in thickness of a grid wire segment, the percent deformation may be calculated using the following formula:

$$\% \text{ Deformation} = 100 \times \frac{(\text{Initial Thickness} - \text{Final Thickness})}{\text{Initial thickness}} \quad \text{Eq. 1}$$

True strain on the grid may also be used to represent the deformation or the corrosion resistance, in which case a logarithmic form may be used to represent the deformation, such as for example:

$$\ln(\text{initial/final}) \quad \text{Eq. 2:}$$

Figure 21:
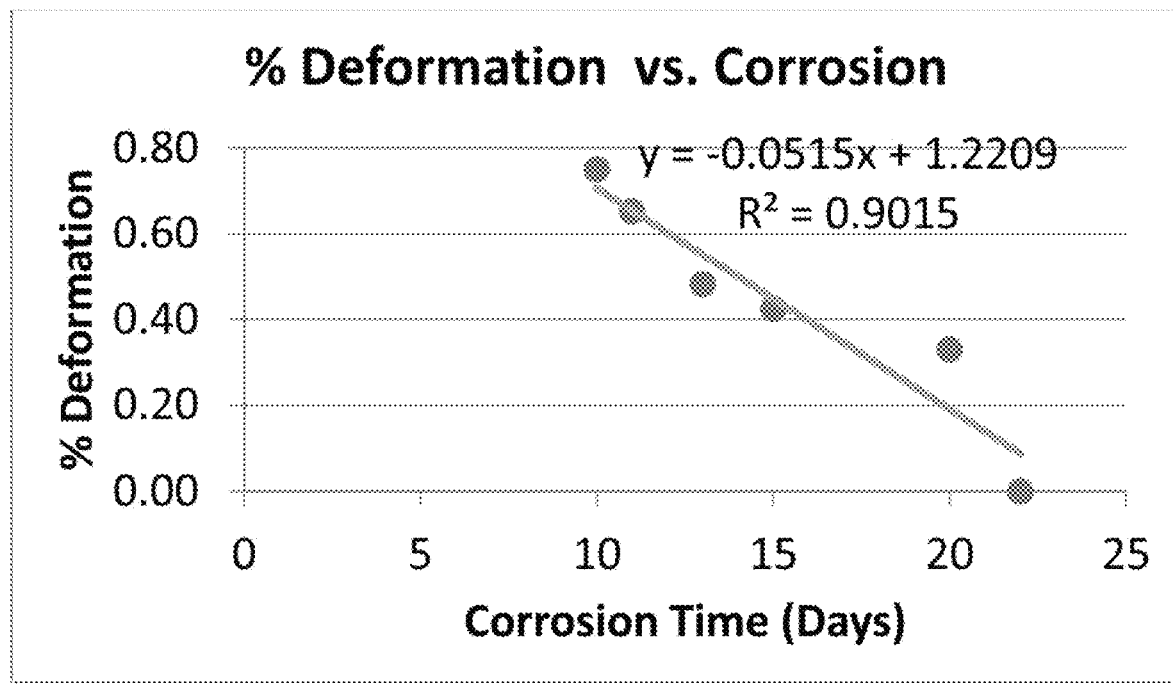
FIG. 21 is a graph showing bare grid corrosion test results.

FIG. 21 shows test results of a bare grid over time having varying degrees of deformation or corrosion resistance on the grid. The percent deformation is calculated using Eq. 1 above.

It was observed during this process that the grid in which selected wires were completely removed demonstrated an increased corrosion rate as compared to a control grid which included initially all grid wires in the pattern. It was found that the corrosion rate of wires with secondary deformation of about 50% was approximately doubled as compared with non-deformed grid wires.

During the same time period, a thirty-five percent (35%) secondary deformation results in a smaller amount of corrosion of the grid wire than a fifty percent (50%) secondary deformation of the grid wire. An example of this correlation is shown in Table 1. As can be seen in reference to Table 1, the percent of secondary deformation can also be varied such that the amount of corrosion or acceleration in corrosion rate is varied between zero (0) (i.e., no acceleration in corrosion rate) and the maximum deformation, which can be upwards of 100%, at which the grid is completely cut.

Thus, a first deformation, referred to hereinabove as resulting from the stamping of the grid or minor deformation of the grid cross-section, is very small, and in particular, in the area of nearly no effect on the scale illustrated in Table 1. The secondary deformation increases the grid corrosion, as compared to a grid without the secondary deformation. A secondary deformation greater than zero (0) as the secondary deformation is designed to have an effect on corrosion, and in particular, to accelerate corrosion of specific segments of the grid wire. The amount of secondary deformation may be varied from greater than zero, to a degree or percentage which provides the desired rate of corrosion.

Example 2

The following example illustrates a hypothetical the relationship between the thickness of the grid and the percent deformation or corrosion resistance. The percent deformation and amount of corrosion resistance is dependent upon the original thickness of the grid.

In one example, a grid having an original grid wire thickness of 0.050 inches is subjected to a 50 percent (%) deformation of a grid wire, causing a final thickness of the grid wire to be 0.025 inches. A grid having an original grid wire thickness of 0.075 inches subjected to a 50 percent (%) deformation of a grid wire, causes the final thickness of the grid wire to be approximately 0.038 inches. Likewise, a grid having an original grid wire thickness of 0.050 inches subjected to a 30 percent (%) deformation of a grid wire provides a final thickness of the grid wire of 0.035 inches, or subjected to an 80 percent (%) deformation of the grid wire provides a final thickness of 0.010 inches. The grid having an original grid wire thickness of 0.075 inches subjected to a 30 percent (%) deformation of a grid wire provides a final thickness of 0.052 inches, or subjected to an 80 percent (%) deformation of the grid wire provides a final thickness of 0.015 inches.

Example 3

In one example of embodiments, one or more battery grid plates has x number of interstices. Each of the interstices is bounded by continuous lengths of grid wires. In this example, after anticipated growth of the positive grid plate within the battery housing, there are less than x number of interstices.

As can be seen from the description herein, various elements of the grid 102 and associated processes may be independently controlled to achieve the desired grid properties. Each of these properties influence the properties of the grid 102, including, but not limited to, corrosion rates. The original grid material strip thickness is not dependent upon other features or aspects and may influence the corrosion of the grid wire(s). The degree of deformation of a grid wire is also independent, in that it imparts corrosion properties to the grid wire, but it also relates to the original grid strip thickness. The shape of the primary deformation 138 and the shape of the secondary deformation 140 are also independently controlled and impart distinct properties to the grid 102. The method of forming the grid 102 and deforming the grid are also independently controlled elements of the grid which may influence grid properties.

One result of the secondary deformation or area of differing or varied corrosion resistance is it minimizes the incidence of battery failure due to uncontrolled grid growth. As a result, the secondary deformation features and methods described herein help increase battery service life.

More specifically, during the service of batteries, the selected wire with secondary deformation is corroded significantly faster than un-deformed, or lesser deformed wires over the grids. The more deformation is completed, the faster corrosion the selected wire incurs. The disappearance of the secondary deformed wire segment then creates free space, which can either accommodate the growth of the grid induced by the corrosion of the un-deformed wires, or release the stress from the corrosion-induced growth of the un-deformed wires, or both. A secondary deformation at a strategic or selected location within the grid may be provided to strategically relieve the internal stress of the grid by creating an opening for grid growth at a predetermined location during service life. As a result, certain types of failure modes related to grid growth are reduced or eliminated, and grid life and/or battery life is elongated. This also greatly reduces costs by decreasing sudden failures leading to replacement cost.

Various additional advantages are provided by the one or more examples of embodiments described herein. Contrary to traditional battery grid understanding, development and use, the battery disclosed and described herein includes battery grids which strategically use battery grid corrosion to relieve stress on the battery grid, thereby avoiding or reducing the problems associated with grid growth. The grid is provided with one or more carefully selected grid wire segments with faster corrosion rates to reduce and/or slow grid growth in grids. For example, secondary deformation may act to redirect the stress and change the direction of grid growth (e.g., as may be caused by corrosion) or control the direction of grid growth over the lifetime of the battery. The amount of the secondary deformation on the selected wires is controllable. Secondary deformation is designed to control mechanical, growth and corrosion properties during the service of batteries. Further, it is not possible to economically or efficiently manufacture a grid having strategically placed openings in the grid for purposes of stress relief of the grid during service life, and traditional grid manufacturing typically requires an intact grid structure for the manufacturing operation to complete properly without damage to the battery grid.

Another advantage of the secondary deformation and corresponding methods is the grid can be formed with less lead material, reducing overall costs of the battery, decreasing overall battery weight, and in some instances battery size. Further, secondary deformation segments can be used in any rolling-punched grids. Moreover, the secondary deformation step and devices for accomplishing secondary deformation in the grid are easy to be installed in the production lines.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A lead-acid battery comprising a plurality of positive battery grid plates each having a frame with a top, a first side, a second side, and a bottom, and a plurality of grid wires interconnected within each of the frames to create interstices therebetween, one or more first segments of one or more of the plurality of the grid wires having a first microstructure with a primary deformation of a first magnitude, one or more second segments of one or more of the plurality of grid wires having a second microstructure, different from the first microstructure, with a secondary deformation of a second magnitude, with the one or more first segments and the one or more second segments being at separate locations, and the one or more first segments having a greater corrosion resistance than the one or more second segments.

2. The lead-acid battery of claim 1 wherein each of the plurality of positive battery grid plates has x number of interstices, each of the interstices being bounded by continuous lengths of grid wires and wherein there are less than x number of interstices after anticipated growth of a respective positive battery grid plate.

3. The lead-acid battery of claim 1 wherein the one or more second segments are frangible and located to relieve stresses resulting from anticipated growth of any one of the plurality of positive battery grid plates.

4. The lead-acid battery of claim 1 wherein the secondary deformation of the second magnitude is greater than the primary deformation of the first magnitude.

5. The lead-acid battery of claim 1 wherein at least one of the one or more first segments and the one or more second segments of the plurality of grid wires is more susceptible to corrosion than a remainder of the plurality of grid wires.

6. The lead-acid battery of claim 1 wherein at least one of the one or more first segments and the one or more second segments are positioned proximate to the interstices.

7. The lead-acid battery of claim 1, wherein the secondary deformation is selected from the group consisting of laser melting, heat treatment, perforation, severe plastic deformation, coining, skew rolling, particle bombardment, water jet machining, vacuum forming, and application of high pressure air, arcs, or sputter pumps.

8. A lead-acid battery comprising a plurality of grid plates being alternating positive and negative grid plates arranged to form a stack, the stack fitted within a battery housing, with each of the plurality of grid plates having a frame with a top, a first side, a second side, and a bottom, a plurality of grid wires interconnected within each of the frames to create interstices therebetween, a first segment of one or more of the plurality of grid wires having a primary deformation of a first magnitude, a second segment of the one or more of the plurality of grid wires having a secondary deformation of a second magnitude, with the first segment and the second segment being at separate locations, and the first segment having a first grain structure and a greater corrosion resistance than the second segment having a second grain structure, with the first grain structure being different from the second grain structure.

9. The lead-acid battery of claim 8 wherein each of the plurality of grid plates has x number of interstices, each of the interstices being bounded by continuous lengths of grid wires and wherein there are less than x number of interstices after anticipated growth of a respective grid plate within the battery housing.

10. The lead-acid battery of claim 8 wherein the second segment being frangible and located to relieve stresses resulting from anticipated growth of any one of the plurality of grid plates within the battery housing.

11. The lead-acid battery of claim 8 wherein the secondary deformation of the second magnitude is greater than the primary deformation of the first magnitude.

12. The lead-acid battery of claim 8 wherein at least one of the first segment and the second segment of the plurality of grid wires is more susceptible to corrosion than a remainder of the plurality of grid wires.

13. The lead-acid battery of claim 8, wherein the secondary deformation is selected from the group consisting of laser melting, heat treatment, perforation, severe plastic deformation, coining, skew rolling, particle bombardment, water jet machining, vacuum forming, and application of high pressure air, arcs, or sputter pumps.

14. A lead-acid battery comprising a plurality of positive battery grid plates each having a frame with a top, a first side, a second side, and a bottom, and a plurality of grid wires interconnected within each of the frames to create interstices therebetween, one or more first locations and one or more second locations of one or more of the plurality of the grid wires having a first microstructure with a primary deformation of a first magnitude, the one or more first locations having a second microstructure, proximate to and different from the first microstructure, with a secondary deformation of a second magnitude, and the one or more second locations having a greater corrosion resistance than the one or more first locations.

15. The lead-acid battery of claim 14 wherein each of the plurality of positive battery grid plates has x number of interstices, each of the interstices being bounded by continuous lengths of grid wires and wherein there are less than x number of interstices after anticipated growth of a respective positive battery grid plate.

16. The lead-acid battery of claim 14 wherein the one or more first locations having the secondary deformation are frangible and located to relieve stresses resulting from anticipated growth of any one of the plurality of positive battery grid plates.

17. The lead-acid battery of claim 14 wherein the secondary deformation of the second magnitude is greater than the primary deformation of the first magnitude.

18. The lead-acid battery of claim 14 wherein the secondary deformation is positioned proximate to the primary deformation at the one or more first locations.

19. The lead-acid battery of claim 14 wherein at least one of the one or more first locations and the one or more second locations is more susceptible to corrosion than a remainder of the plurality of grid wires.

20. The lead-acid battery of claim 14, wherein the secondary deformation is selected from the group consisting of laser melting, heat treatment, perforation, severe plastic deformation, coining, skew rolling, particle bombardment, water jet machining, vacuum forming, and application of high pressure air, arcs, or sputter pumps.

* * * * *